(12) United States Patent
Nishikubo et al.

(10) Patent No.: US 11,871,690 B2
(45) Date of Patent: Jan. 16, 2024

(54) AGRICULTURAL MACHINE

(71) Applicant: KUBOTA CORPORATION, Osaka (JP)

(72) Inventors: Takuya Nishikubo, Sakai (JP); Hiroshi Miyake, Sakai (JP)

(73) Assignee: KUBOTA CORPORATION, Osaka (JP)

(*) Notice: Subject to any disclaimer, the term of this patent is extended or adjusted under 35 U.S.C. 154(b) by 463 days.

(21) Appl. No.: 17/141,260

(22) Filed: Jan. 5, 2021

(65) Prior Publication Data

US 2021/0120728 A1 Apr. 29, 2021

Related U.S. Application Data

(63) Continuation of application No. PCT/JP2019/045476, filed on Nov. 20, 2019.

(30) Foreign Application Priority Data

Feb. 14, 2019 (JP) .................. 2019-024624

(51) Int. Cl.
 *A01B 69/04* (2006.01)
 *G05D 1/00* (2006.01)
 *G05D 1/02* (2020.01)

(52) U.S. Cl.
 CPC ......... *A01B 69/008* (2013.01); *G05D 1/0088* (2013.01); *G05D 1/0214* (2013.01); *G05D 2201/0201* (2013.01)

(58) Field of Classification Search
 None
 See application file for complete search history.

(56) References Cited

U.S. PATENT DOCUMENTS

| 2018/0206392 | A1 | 7/2018 | Matsuzaki |
| 2018/0210444 | A1 | 7/2018 | Sakaguchi et al. |
| 2021/0018617 | A1* | 1/2021 | Iwase ................. G01S 15/93 |

FOREIGN PATENT DOCUMENTS

| CN | 104908817 A | 9/2015 |
| CN | 108334063 A | 7/2018 |
| CN | 108334064 A | 7/2018 |
| CN | 208013430 U | 10/2018 |
| EP | 3 572 302 A1 | 11/2019 |
| EP | 3 572 897 A1 | 11/2019 |
| JP | 63-185760 U | 11/1988 |
| JP | 01-173110 A | 7/1989 |
| JP | 5-34593 U | 5/1993 |
| JP | 6-17410 U | 3/1994 |
| JP | 11-153442 A | 6/1999 |

(Continued)

OTHER PUBLICATIONS

Official Communication issued in International Patent Application No. PCT/JP2019/045476, dated Feb. 10, 2020.

(Continued)

*Primary Examiner* — Tamara L Weber
(74) *Attorney, Agent, or Firm* — Keating & Bennett, LLP

(57) ABSTRACT

An agricultural machine includes a vehicle body including a front wheel and a rear wheel, a hood at a front portion of the vehicle body, a protector provided to the vehicle body to protect an operator seat, and an obstacle detector to detect an obstacle, the obstacle detector being located in front of the protector outwardly in a width direction of the hood.

17 Claims, 22 Drawing Sheets

(56) References Cited

FOREIGN PATENT DOCUMENTS

| | | |
|---|---|---|
| JP | 2018-174890 A | 11/2018 |
| JP | 2018-185236 A | 11/2018 |
| WO | 2018/135256 A1 | 7/2018 |
| WO | 2018/135257 A1 | 7/2018 |

OTHER PUBLICATIONS

Official Communication issued in corresponding European Patent Application No. 19915213.3, dated Oct. 13, 2022.
Official Communication issued in corresponding Chinese Patent Application No. 201980092103.6, dated Nov. 18, 2022.

* cited by examiner

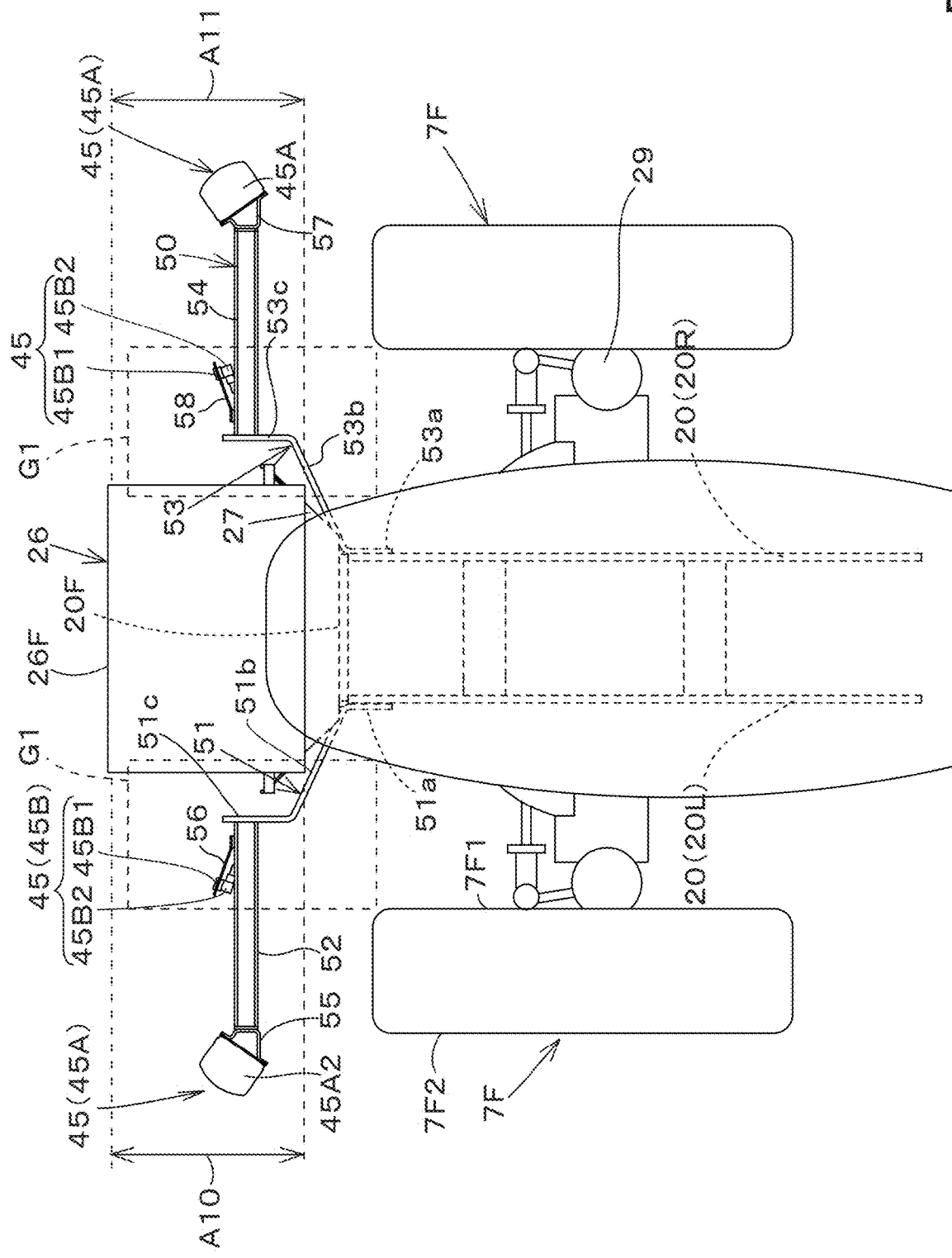

| Left side Obstacle detector | Right side Obstacle detector |
|---|---|
| J1 | J1 |
| J2 | J2 |
| J3 | J3 |
| ... | ... |

※J1, J2, J3 : Horizontal distance(m) from center in width to obstacle detector

FIG.17A

AGRICULTURAL MACHINE

CROSS REFERENCE TO RELATED APPLICATIONS

This application is a continuation application of International Application No. PCT/JP2019/045476, filed on Nov. 20, 2019, which claims the benefit of priority to Japanese Patent Application No. 2019-024624, filed on Feb. 14, 2019. The entire contents of each of these applications are hereby incorporated herein by reference.

BACKGROUND OF THE INVENTION

1. Field of the Invention

The present invention relates to an agricultural machine such as a tractor, a combine, and a rice transplanter.

2. Description of the Related Art

A tractor disclosed in Japanese Unexamined Patent Publication No. 2018-174890 is known.

The tractor disclosed in Japanese Unexamined Patent Publication No. 2018-174890 is provided with an electronic control system for automatic driving to automatically drive a vehicle body, an obstacle detector module to detect the presence or absence of obstacles, a traveling suppression controller portion to suppress traveling of the vehicle body in which the obstacle detector module detects the obstacles, and a plurality of obstacle sensors to detect the obstacles present in an area to be searched.

SUMMARY OF THE INVENTION

An agricultural machine according to one aspect of a preferred embodiment of the present invention, includes a vehicle body including a front wheel and a rear wheel, a hood at a front portion of the vehicle body, a protector provided to the vehicle body to protect an operator seat, and an obstacle detector to detect an obstacle, the obstacle detector being located in front of the protector outwardly in a width direction of the hood.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3B is an enlarged plan view illustrating a front portion of a tractor.
FIG. 17A is a view illustrating an example of storing a detection position to a controller device and the like.

DETAILED DESCRIPTION OF THE PREFERRED EMBODIMENTS

Figure 1:
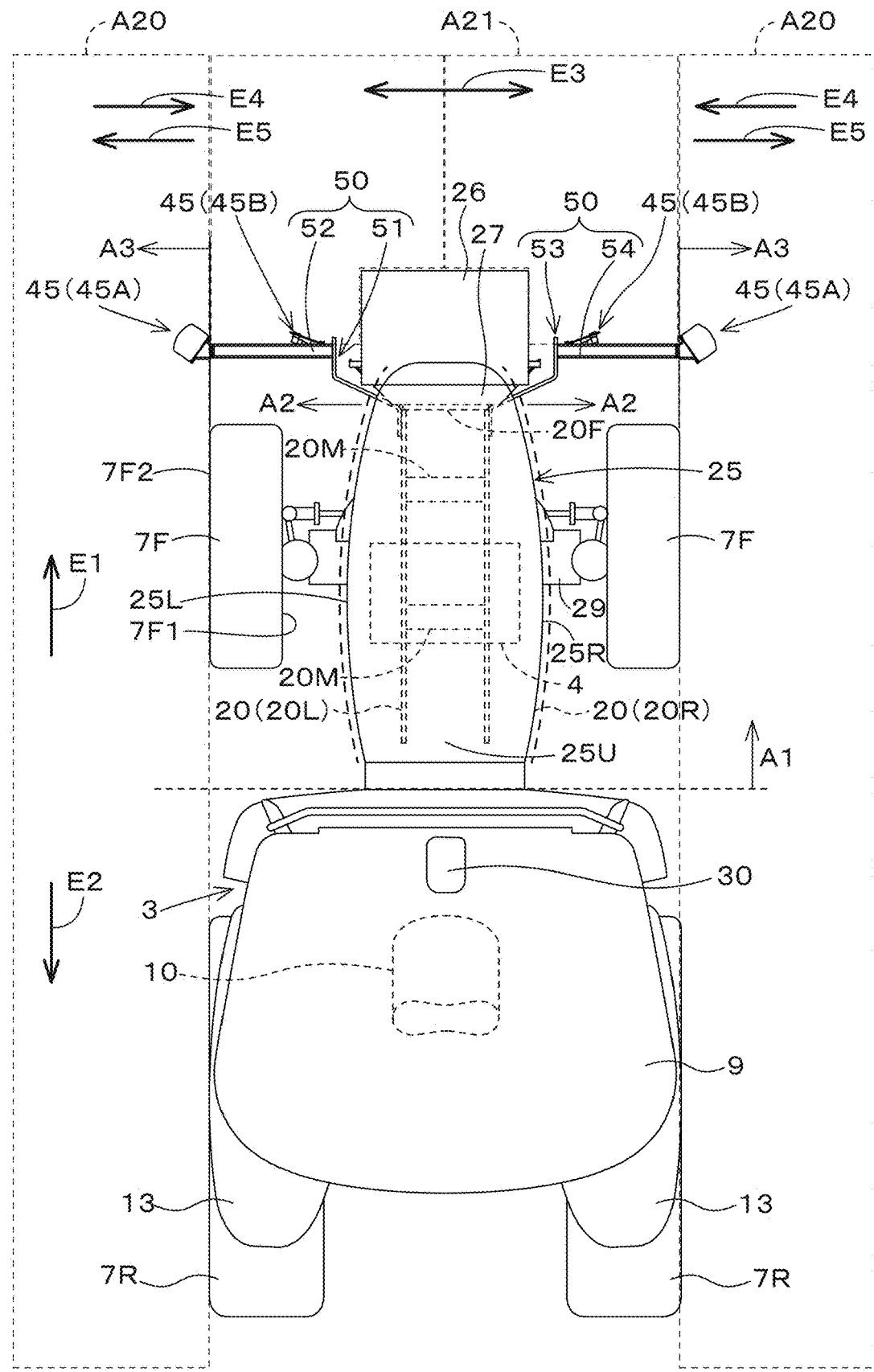
FIG. 1 is a plan view illustrating a whole of tractor.

Preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

FIG. 1 shows a tractor, one of the agricultural machines. In this preferred embodiment, the tractor is used as an example to explain an agricultural machine, but the agricultural machine may be a combine harvester, a rice transplanter, and the like, in addition to the tractor. For convenience of explanation, a direction of an arrowed line E1 in FIG. 1 is referred to as the front, a direction of an arrowed line E2 is referred to as the rear, and a direction of an arrowed line E3 is referred to as a width direction. In the width direction E3, an arrowed line E4 side may be referred to as an inward width direction and an arrowed line E5 side may be referred to as an outward width direction.

Figure 2:
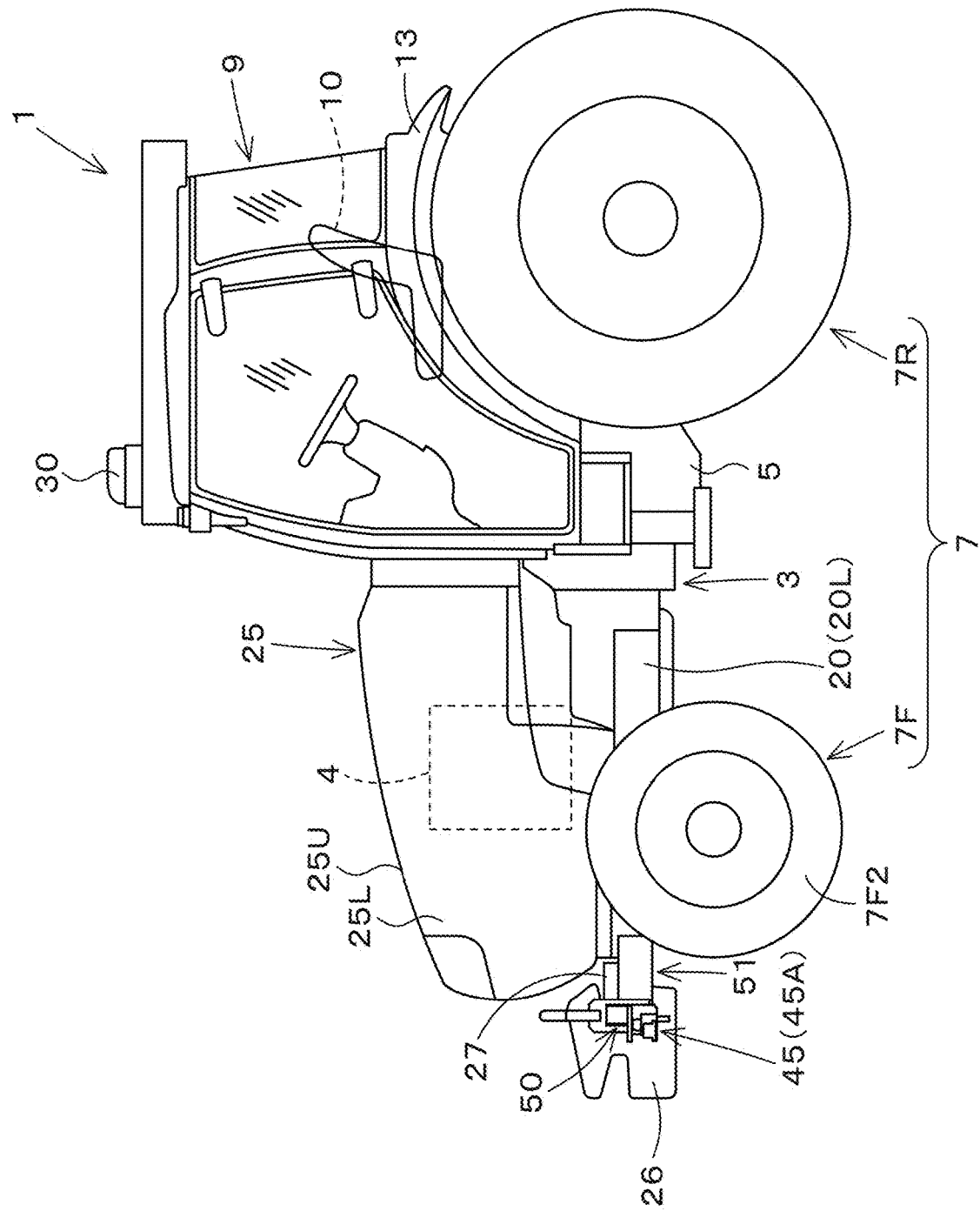
FIG. 2 is a side view illustrating a whole of tractor.

As shown in FIG. 1 and FIG. 2, the tractor 1 is provided with a vehicle body 3 including a traveling device 7, a prime mover 4, and a speed-shifter device (transmission device) 5. The traveling device 7 includes front wheels 7F and rear wheels 7R. The front wheels 7F may be tire type or crawler type. The rear wheels 7R also may be the tire or crawler type. The prime mover 4 is an engine (diesel engine, gasoline engine), electric motor, and the like. The speed-shifter device 5 can switch the propulsion of the traveling device 7 by shifting gears, and can also switch the traveling device 7 between to the forward traveling or the backward traveling. An operator seat 10 is provided in the vehicle body 3. The operator seat 10 is protected by a protector device 9. The protector device 9 is a cabin that protects the operator seat 10 by surrounding the operator seat 10 in front, behind, above, and to the sides, or a ROPS (Rollover protection structure) that protects the operator seat 10 by covering at least the upper portion of the operator seat 10. A fender 13 is mounted below the protector device 9, and the fender 13 covers the upper portion of the rear wheels 7R.

At the rear portion of the vehicle body 3, a coupler portion including a three-point linkage mechanism or the like is provided. A working device can be attached to and detached from the coupler portion. By connecting the working device to the coupler portion, the working device can be towed by the vehicle body 3. The working device includes a cultivator for plowing, a fertilizer sprayer for spreading fertilizer, a pesticide sprayer for spreading pesticides, a harvester for harvesting, a mower for cutting grass and the like, a tedder for tedding grass and the like, a rake for raking grass and the like, and a baler for forming grass and the like.

As shown in FIG. 1, the vehicle body 3 includes a plurality of vehicle body frames 20. The plurality of vehicle body frames 20 includes a vehicle body frame 20L on the left side and a vehicle body frame 20R on the right side. The vehicle body frame 20L and the vehicle body frame 20R each extend forward from the transmission 5 side and support the lower portion of the prime mover 4. The vehicle body frame 20L and the vehicle body frame 20R are separated in the width direction. The front end portion of the vehicle frame 20L and the front end portion of the vehicle frame 20R are connected by the front coupler plate 20F. The middle portion of the vehicle body frame 20L and the middle portion of the vehicle body frame 20R are connected by the middle coupler plate 20M. The vehicle body frame 20L and the vehicle body frame 20R support the front axle case 29. A front axle 15 (see FIG. 6), which rotatably supports the front wheel 7F, is housed in the front axle case 29. The vehicle body frame 20 may be a frame that supports a structure other than the front axle case 29.

A hood 25 is provided at the upper portion of the plurality of vehicle body frames 20. The hood 25 is extended in the front-to-rear direction along the vehicle body frame 20. The hood 25 is located at the center of the width direction of the protector device 9. As shown in FIG. 1 and FIG. 2, the hood 25 includes a left sidewall 25L provided on the left side, a right sidewall 25R provided on the right side, and an upper wall 25U connecting the upper portion of the left sidewall 25L and the right sidewall 25R. The left sidewall 25L, right sidewall 25R and upper wall 25U form the engine compartment, and the engine compartment houses the prime mover 4, a cooling fan, a radiator, a battery, and the like. The front wheels 7F are respectively located on the left side of the left sidewall 25L and on the right side of the right sidewall 25R.

A weight 26 is provided on the front side of the hood 25, that is, on the front sides of the body frames 20L and 20R. The weight 26 is attached to a weight bracket 27 which is attached to the front coupler plate 20F by bolts or other fasteners.

Figure 6:
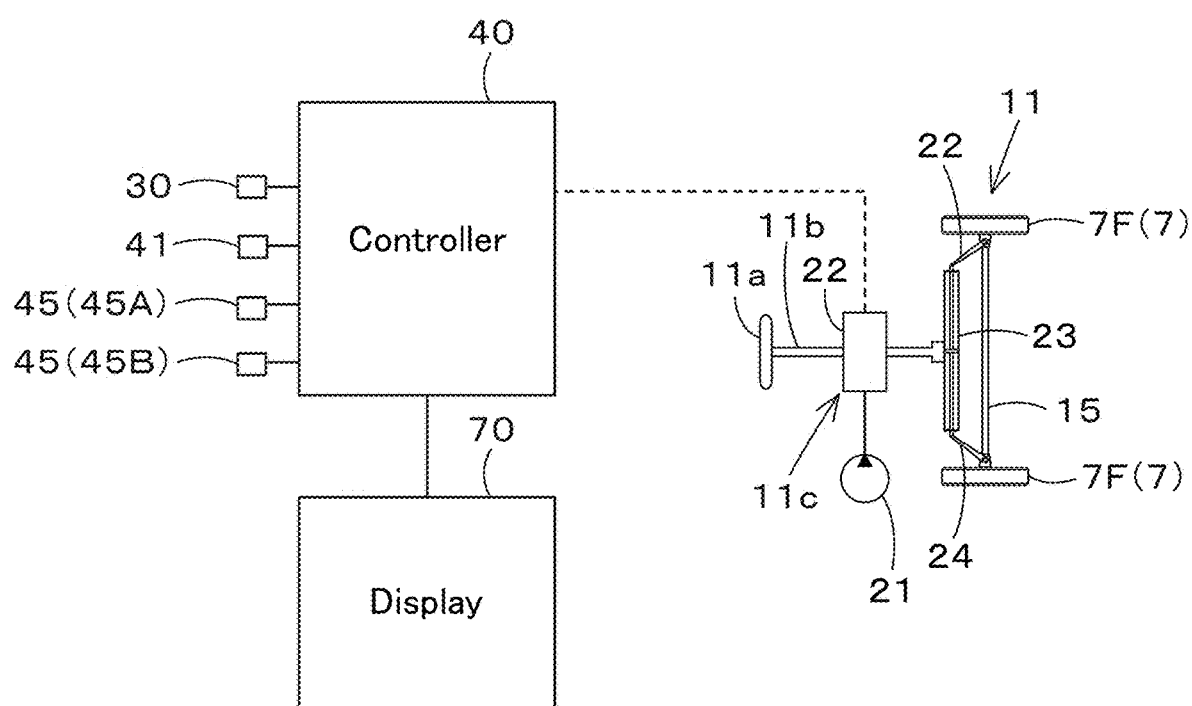
FIG. 6 is a block diagram of a tractor.

As shown in FIG. 6, the tractor 1 is provided with a steering device 11. The steering device 11 includes a steering wheel (handling wheel) 11a, a rotation shaft (steering shaft) 11b that rotates in accordance with the rotation of the steering wheel 11a, and an assist mechanism (power steering mechanism) 11c that assists the steering of the steering wheel 11a. The assist mechanism 11c includes a hydraulic pump 21, a control valve 22 to which hydraulic fluid discharged from the hydraulic pump 21 is supplied, and a steering cylinder 23 to be operated by the control valve 22. The control valve 22 is a solenoid valve that is activated based on a control signal. For example, the control valve 22 is a three-position switching valve that can be switched by moving a spool or the like. The control valve 22 can also be switched by the steering of the steering shaft 11b. The steering cylinder 23 is connected to an arm (knuckle arm) 24 that changes the direction of the front wheels 7F.

Thus, when the handle 11a is operated, the switching position and opening degree of the control valve 22 are switched according to the operation of the handle 11a, and the steering direction of the front wheels 7F can be changed by extending or retracting the steering cylinder 23 to the left or right according to the switching position and opening degree of the control valve 22. The steering device 11 described above is an example and is not limited to the configuration described above.

The tractor 1 is provided with a position detector device 30. The position detector device 30 is mounted on the top plate of the protector device 9. Although the position detector device is mounted on the top panel of the protector device 9, the location of the device on the vehicle body 3 is not limited and may be elsewhere. The position detector device 30 may also be mounted on the working device.

The position detector device 30 is a device that detects its own position (positioning information including latitude and longitude) using a satellite positioning system. That is, the position detector device 30 receives signals (for example, including position of the positioning satellite, transmission time, correction information, and the like) transmitted from the positioning satellite, and detects the position (latitude and longitude) based on the received signals. The position detector device 30 may detect its own position (latitude, longitude) based on the position corrected based on signals such as corrections from a base station (reference station) that can receive signals from positioning satellites. The position detector device 30 may also include an inertial measurement unit such as a gyro sensor or an acceleration sensor, and detect the position corrected by the inertial measurement device as its own position. According to the position detector device 30 described above, the position (traveling position) of the tractor 1 (vehicle body 3) can be detected by the position detector device 30.

The tractor 1 is provided with a controller device 40. The controller device 40 includes a CPU, an electric circuit, an electronic circuit, and the like, and controls various aspects of the tractor 1. The controller device 40 is connected to a status detector device 41 that detects the driving status and other conditions of the tractor 1. The status detector device 41 is, for example, a device that detects the status of the traveling system, and the like. For example, the status detector device 41 detects the status of a crank sensor, a cam sensor, an engine revolutions sensor, a gas pedal sensor, a vehicle speed sensor, a steering angle sensor, a position detector device 30, and the like. In addition to the status of the traveling system, the status detector device 41 may be a lifter lever detection sensor, a PTO rotation detection sensor, and the like.

The controller device 40 controls the traveling system and the working system in the tractor 1. For example, the controller device 40 controls an engine speed, a vehicle speed, a steering angle of the steering device 11, and the like based on the detection status detected by the status detector device 41. The status detector device 41 also controls the raising and lowering of the lifter device that raises and lowers the coupler portion, the PTO speed, and the like based on the detection status detected by the status detector device 41.

The controller device 40 is capable of controlling the automatic traveling of the tractor 1 (vehicle body 3) (automatic traveling control). The controller device 40 can be switched between the automatic traveling mode and the manual traveling mode. When in the automatic traveling mode, the controller device 40 sets the switching position and opening degree of the control valve 22 such that at least the traveling position of the vehicle body (the position detected by the position detector device 30) and the preset traveling route (traveling path) coincide with each other, that is, such that the vehicle body 3 and the traveling route coincides with each other. In other words, when in the automatic traveling mode, the controller device 40 sets the movement direction and the movement amount of the steering cylinder 35 (steering direction and steering angle of the front wheels 7F) so that the traveling position of the tractor 1 matches the traveling route.

In detail, when the vehicle is in the automatic traveling mode, the controller device 40 compares the traveling position of the vehicle body 3 with the position indicated by the traveling route (scheduled traveling position), and when the traveling position and the scheduled traveling position coincide each other, the steering angle and direction of the steering wheel 11a in the steering device 11 (steering angle and steering direction of the front wheels 7F) are maintained without being changed (the opening degree and switching position of the control valve 22 are maintained without being changed). When the traveling position and the scheduled traveling position do not coincide each other, the controller device 40 changes the steering angle and/or the steering direction of the handle 11a in the steering device 11 (changes the opening degree and/or the switching position of the control valve 22) such that the deviation (amount of displacement) between the traveling position and the scheduled traveling position becomes zero.

In the above-mentioned preferred embodiment, the controller device 40 changes the steering angle of the steering device 11 based on the deviation between the traveling position and the scheduled traveling position in the automatic traveling control. However, when the orientation of the traveling route and the orientation (vehicle body heading) of the traveling direction (running direction) of the tractor 1 (vehicle body 3) are different, the controller device 40 may set the steering angle so that the vehicle body orientation matches the traveling route orientation. The controller device 40 may also set the final steering angle in the automatic traveling control based on the steering angle obtained based on the deviation (positional deviation) and the steering angle obtained based on the orientational deviation. The setting of the steering angle in the automatic traveling control in the above-mentioned preferred is an example and is not limited thereto.

In the automatic traveling control, the controller device 40 may control the speed of the traveling device 7, that is, the front wheels 7F and/or the rear wheels 7R, so that the actual speed of the tractor 1 (vehicle body 3) matches the speed corresponding to the preset traveling route.

The controller device 40 also controls the automatic traveling based on the detection results of obstacles in the obstacle detector device 45 to be described later. For example, when the obstacle detector device 45 does not detect any obstacle, the automatic traveling is continued, and when the obstacle detector device 45 detects an obstacle, the automatic traveling is stopped. More specifically, when the obstacle detector device 45 detects an obstacle, the controller device 40 stops the automatic traveling by stopping the tractor 1 under a condition where the distance between the obstacle and the tractor 1 is less than a predetermined distance.

As shown in FIG. 1, the tractor 1 is provided with a plurality of obstacle detector devices 45. Each of the plurality of obstacle detector devices 45 is capable of detecting an object, that is, an obstacle, existing around the tractor 1. At least one of the plurality of obstacle detector devices 45 is provided in front of the protector device 9 and outside the width direction of the hood 25. That is, when focusing on the area (forward area) A1 in front of the protector device 9 of the tractor 1, at least one obstacle detector device 45 is located in the area (outside area) A2 in the width direction outside the left sidewall 25L of the hood 25, or in the area (outside area) A2 in the width direction outside the right sidewall 25R of the hood 25.

In particular, in the front wheel 7F, when the side facing the side wall (left sidewall 25L, right sidewall 25R) of the hood 25 is the inner side portion 7F1 and the side opposite the inner side portion 7F1 is the outer side portion 7F2, the obstacle detector device 45 is located outside the width direction from the outer side portion 7F2. In other words, the obstacle detector device 45 is provided at the outer side of the front wheel 7F. The obstacle detector device 45 is provided in front of the front wheels 7F.

Figure 5:
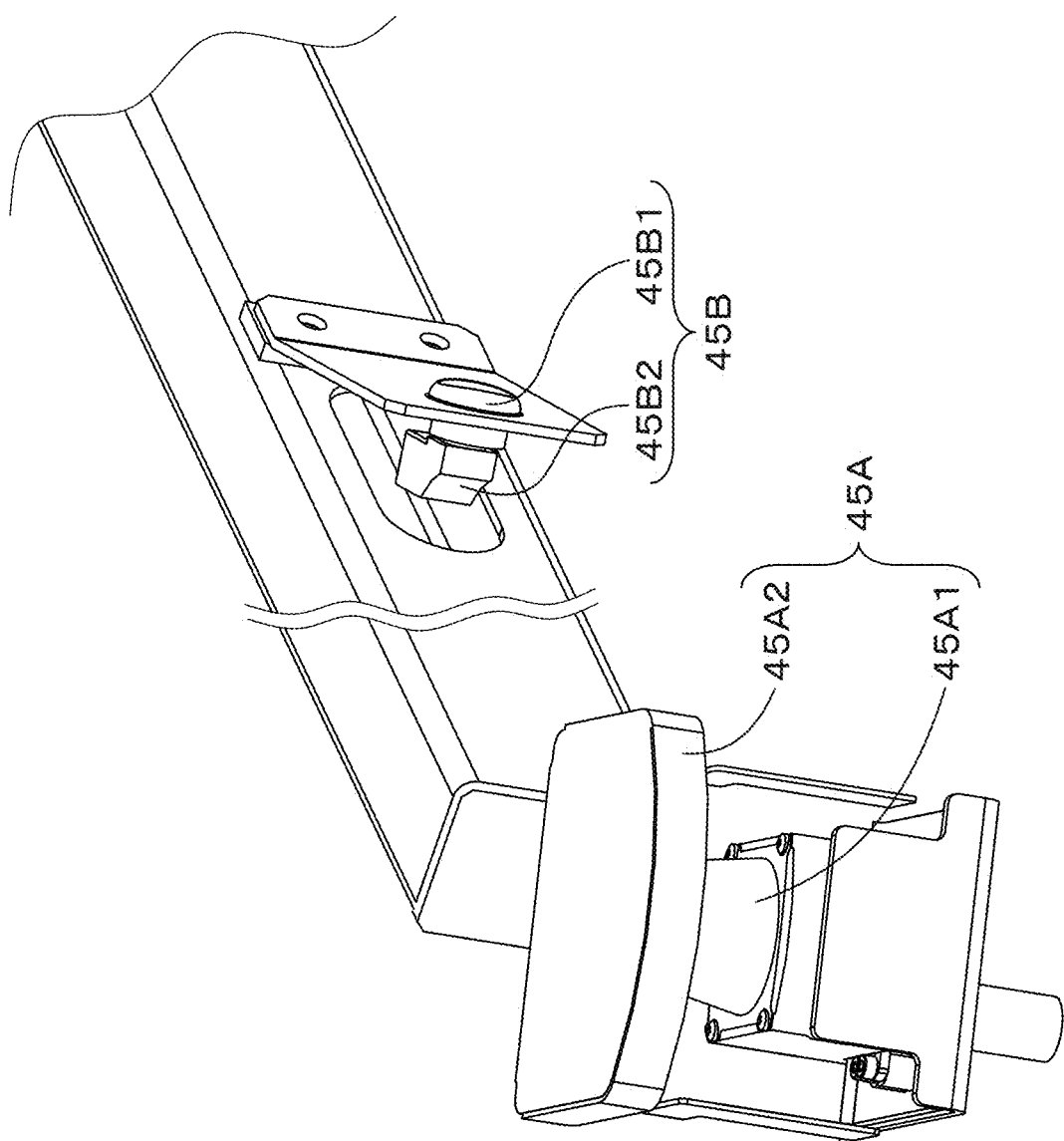
FIG. 5 is an enlarged view of an obstacle detector device.

As shown in FIG. 5, the obstacle detector device 45 may include or be a laser scanner 45A, a sonar 45B, and the like. The laser scanner 45A detects an object (obstacle) by irradiating a laser. The laser scanner 45A includes a light emitter/receiver 45A1 and a housing 45A2. The light emitter/receiver 45A1 irradiates the laser and receives the reflected light when the irradiated laser hits the obstacle. The housing 45A2 is a case that houses the light emitter/receiver 45A1. The laser scanner 45A detects the distance to the obstacle based on the time between the irradiation of the laser and the reception of the light.

The sonar 45B detects objects (obstacles) by irradiating sound waves. The sonar 45B includes a sound emitter/receiver 45B1 and a housing 45B2. The sound emitter/receiver 45B1 emits sound waves and receives the reflected sound waves from the obstacles. The housing 45B2 is a case that houses the sound emitter 45B1. The sonar 45B detects the distance to the obstacle based on the time between the irradiation of the sound wave and the reception of the reflected sound.

Figure 4:
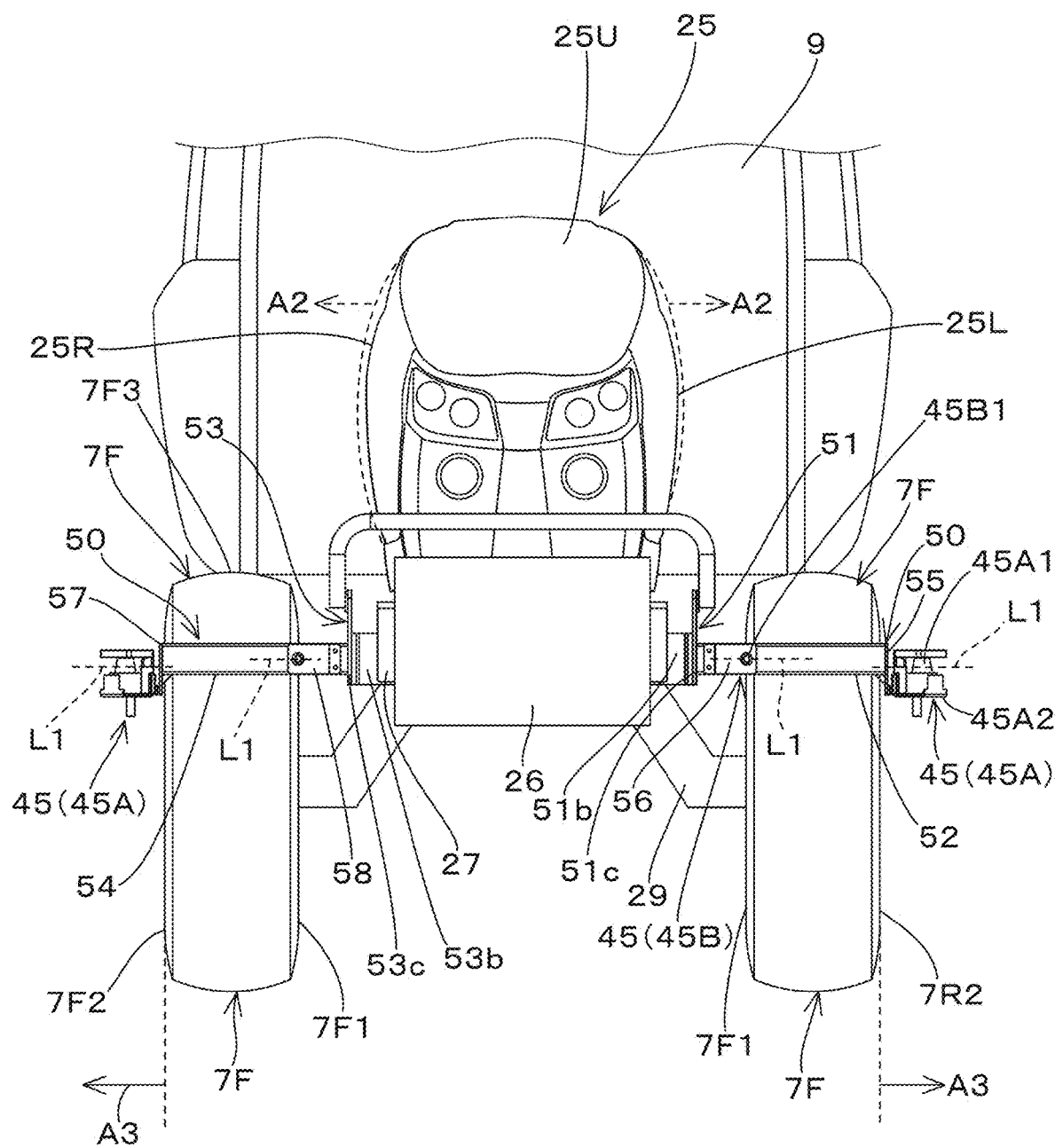
FIG. 4 is a front view of a tractor.

As shown in FIG. 1 and FIG. 4, the laser scanner 45A is located in front of the front wheel 7F and outside the width direction from the outer side portion 7F2 of the front wheel 7F. In more detail, the light emitter/receiver 45A1 of the laser scanner 45A is located in front of the front wheel 7F and outwardly in the width direction of the outer side portion 7F2.

The light emitter/receiver 45A1 of the laser scanner 45A is installed at a lower position than the upper end portion 7F3 of the front wheel 7F. In other words, the light emitter/receiver 45A1 is located below the upper wall 25U of the hood 25 and above the front axle 15.

The sonar 45B is provided in front of the front wheel 7F, between the inner side portion 7F1 of the front wheel 7F and the sidewalls (left sidewall 25L, right sidewall 25R) of the hood 25. More precisely, in the sonar 45B, the sound emitter/receiver 45B1 is installed in front of the front wheel 7F and between the inner side portion 7F1 and the side wall of the hood 25. In other words, as shown in FIG. 3B, the sonar 45B is provided in the projected area (projection area G1) when the area between the inner side portion 7F1 of the front wheel 7F and the sidewalls (left sidewall 25L, right sidewall 25R) of the hood 25 is projected toward the front of the front wheel 7F.

Figure 3A:
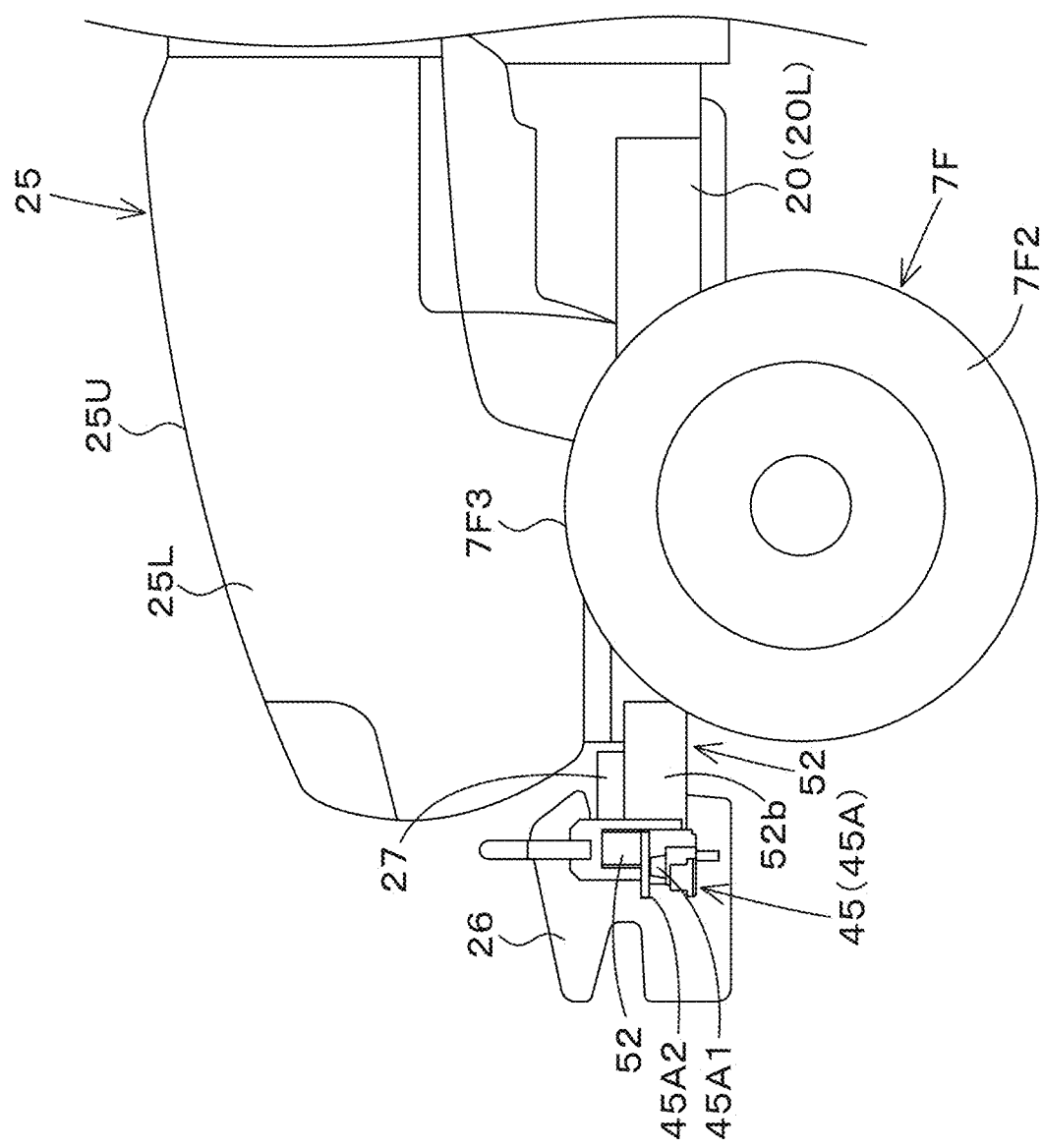
FIG. 3A is an enlarged side view illustrating a front portion of a tractor.

As shown in FIG. 1, FIG. 3B and FIG. 4, the obstacle detector device 45 is supported on the vehicle body 3 by a support mechanism 50. The support mechanism 50 is a fixing mechanism that fixes the obstacle detector device 45 to the vehicle body 3 in a position that cannot be changed. The support mechanism 50 is provided with a left support body 51 attached to the front portion of the vehicle body frame 20L and protruding forward, and a left support arm 52 extending, to the left, from the left support body 51 outward in the width direction.

The left support portion 51 includes an attachment plate 51a attached to the vehicle body frame 20L, an extension plate 51b that shifts outward in the width direction as extending forward from the attachment plate 51a, and an attachment plate 51c that extends forward from the extension plate 51b and to which the left support arm 52 is attached. The attachment plate 51c is located on the left side (left side) of the weight 26.

The left support arm 52 is a metal member preferably having a square cylindrical shape. One end portion of the left support arm 52 is attached to the attachment plate 51c, and the other end portion of the left support arm 52 is the free end. The free end side of the left support arm 52 is located on the outer side portion 7F2 side of the left wheel 7F, and the laser scanner 45A is attached to the free end side of the left support arm 52 via a bracket 55. A bracket 55 is attached to the free end side of the left support arm 52, and the housing 45A2 of the laser scanner 45A is attached to the bracket 55. The bracket 55 supports the housing 45A2 so that the irradiation line L1 is in the horizontal direction when the irradiation line of the laser from the light emitter/receiver 45A1 is designated as "L1". In other words, the bracket 55 supports the housing 45A2 so that the upper surface of the housing 45A2 and the upper portion of the left support arm 52 are parallel each other.

In addition, a bracket 56 is attached to the middle portion of the left support arm 52, and the housing 45B2 of the sonar 45B is attached to the bracket 56.

According to the above, the left support arm 52 supports the laser scanner 45A, which is one of the obstacle detector devices 45, in front of the protector device 9 and at the left outer side of the hood 25 in the width direction, and at the left side of the weight 26.

The left support arm 52 supports not only the laser scanner 45A but also the sonar 45B on the left side of the weight 26. In other words, as shown in FIG. 3B, the left support arm 52 is located at the left side of the weight 26 and behind the front end 26F of the weight 26. The obstacle detector device 45 (laser scanner 45A and sonar 45B) is located on the left side of the weight 26 and is provided behind the front end 26F of the weight 26 in the same manner as the left support arm 52. In more detail, the left support arm 52 and the obstacle detector device 45 (laser scanner 45A and sonar 45B) are provided in the area A10 between the front end 26F and the rear end portion of the weight 26 at the left side of the weight 26.

The support mechanism 50 includes a right support body 53 attached to the front portion of the vehicle body frame 20R and projecting forward, and a right support arm 54 extending from the right support body 53 outward in the width direction and to the right side. The right support body 53 and the right support arm 54 support the obstacle detector device 45 on the opposite side of the left support body 51 and the left support arm 52. The structure of the right support body 53 and the right support arm 54 is the same as those of the left support body 51 and the left support arm 52.

The right support body 53 includes an attachment plate 53a attached to the vehicle body frame 20R, an extension plate 53b that shifts outward in the width direction as extending forward from the attachment plate 53a, and an attachment plate 53c that extends forward from the extension plate 53b and to which the right support arm 54 is attached. The attachment plate 53c is located on the right side (to the right of) of the weight 26.

The right support arm 54 is a metal member preferably having a square cylindrical shape. One end portion of the right support arm 54 is attached to the attachment plate 53c, and the other end portion of the right support arm 54 is a free end. The free end side of the right support arm 54 is located on the outer side portion 7F2 side of the right wheel 7F, and the laser scanner 45A is attached to the free end side of the right support arm 54 via a bracket 57. A bracket 57 is attached to the free end side of the right support arm 54, and the housing 45A2 of the laser scanner 45A is attached to the bracket 57. The bracket 57 supports the housing 45A2 so that the irradiation line L1 of the light emitter/receiver 45A1 is in the horizontal direction. In other words, the bracket 57 supports the housing 45A2 so that the upper surface of the housing 45A2 and the upper portion of the right support arm 54 are parallel.

In addition, a bracket 58 is attached to the middle of the right support arm 54, and the housing 45B2 of the sonar 45B is attached to the bracket 58.

According to the above, the right support arm 54 supports the laser scanner 45A, which is one of the obstacle detector devices 45, in front of the protector device 9 and at the right outer side of the hood 25 in the width direction and at the right side of the weight 26. The right support arm 54 supports not only the laser scanner 45A but also the sonar 45B on the right side of the weight 26. In other words, as shown in FIG. 3B, the right support arm 54 is located on the right side of the weight 26 and behind the front end 26F of the weight 26. In addition, the obstacle detector device 45 (laser scanner 45A and sonar 45B) is located on the right side of the weight 26 and is provided behind the front end 26F of the weight 26 in the same manner as the right support arm 54. In more detail, the right support arm 54 and the obstacle detector device 45 (laser scanner 45A and sonar 45B) are provided in the area A11 between the front end portion 26F and the rear end portion of the weight 26 at the right side of the weight 26.

Figure 15:
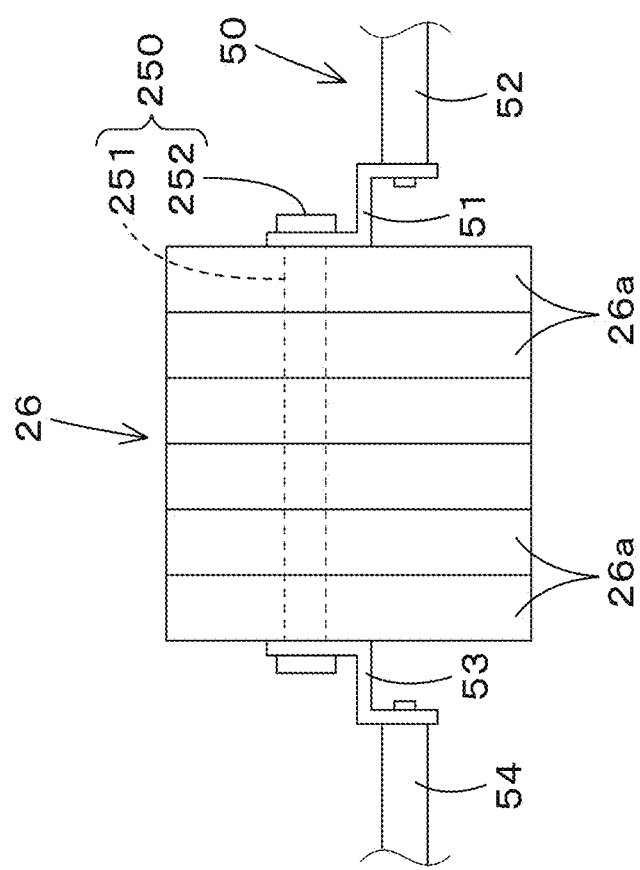
FIG. 15 is a view illustrating a weight supporting a support arm.

In the above-described preferred embodiment, the left support portion 51 and the right support portion 53 are attached to the vehicle body frame 20 to support the support arms (left support arm 52 and right support arm 54), but they may also be attached to the weight 26. As shown in FIG. 15, the weight 26 includes a plurality of individual plates 26a and a coupler tool 250 that connects the plurality of individual plates 26a. The coupler tool 250 includes a rod material 251 such as a bolt that can be inserted into a hole in the plurality of individual plates 26a, and a retainer tool 252 such as a nut that stops the rod material 251 from being released. The left support portion 51 and right support portion 53 have insertion holes for insertion of the bar material 251, and are fixed (supported) to the weight 26 by being tightened together with the plurality of individual plates 26a.

Figure 16:
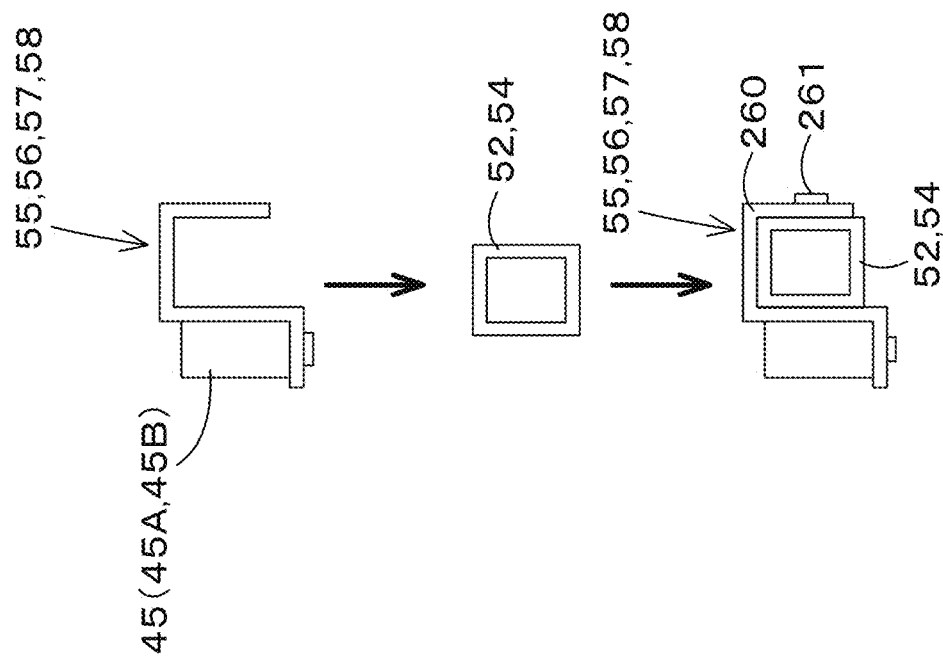
FIG. 16 is a view illustrating how to hook, on a support arm, a bracket to which an obstacle detector device is attached.

As shown in FIG. 16, the brackets 55 to 58 may be of the hook type (hanging type). In particular, the brackets 55 to 58 include a hooking portion 260 that hangs on the outer surface of the support arms (left support arm 52, right support arm 54), and an insertion hole is provided in the hooking portion 260 to insert a fastener tool 261 such as a bolt. In addition, the support arms (left support arm 52 and right support arm 54) include fastening holes to insert and fasten the fastener tools 261. Thus, the obstacle detector device 45 (laser scanner 45A and sonar 45B) can be easily mounted by hanging the hanging portion 260 of the brackets 55 to 58 on the support arms and fastening the fastener tools 261 to the support arms.

As described above, the agricultural machine includes the vehicle body 3 including front wheels 7F and rear wheels 7R, the hood 25 provided on the front side of the vehicle body 3, the protector device 9 provided on the vehicle body 3 and protecting the operator seat 10, and the obstacle detector device 45 capable of detecting obstacles and located in front of the protector device 9 and outside the width direction of the hood 25. The obstacle detector device 45 is installed in front of the protector device 9 and outside the width direction of the hood 25. According to this configuration, for example, in an agricultural machine such as the tractor 1, an obstacle in the vicinity of the hood 25 located in front of the protector device 9 can be easily and accurately detected by the obstacle detector device 45. For example, even when a structure protruding outward in the width direction from the hood 25 is provided in the agricultural machine, the obstacle detector device 45 can detect the condition around the structure.

The obstacle detector device 45 is provided on the side of the front wheel 7F, that is, outward in the width direction or inward in the width direction. According to this configuration, as shown in FIG. 1, obstacles existing in the lateral area A20 of the front wheels 7F and the front area A21 of the front wheels 7F can be accurately detected in the agricultural machine. In particular, when the laser scanner 45A is provided at the side of the front wheels 7F as an obstacle detector device 45, a wide range of obstacles from the front to the rear portion of the vehicle body 3 can be detected by the obstacle detector device 45.

The obstacle detector device 45 is provided in front of the front wheels 7F. According to this configuration, obstacles existing around the front wheels 7F can be accurately detected by the obstacle detector device 45. For example, when the size of the front wheel 7F is large, the obstacle detector device 45 can detect more obstacles around the front wheel 7F than the obstacle detector device mounted on the protector device 9 behind the front wheel 7F.

The obstacle detector device 45 is provided in front of the front wheels 7F and between the hood 25 and the front wheels 7F, that is, within the width of the hood 25 and the front wheels 7F in front of the front wheels 7F (projection range G1). According to this configuration, an obstacle existing between the hood 25 and the front wheels 7F can be detected more accurately by the obstacle detector device 45.

The agricultural machine is provided with body frames 20L and 20R that support the hood 25, and support arms (left support arm 52 and right support arm 54) that extend outward in the width direction from the body frames 20L and 20R and support the obstacle detector device 45. According to this configuration, the obstacle detector device 45 can be firmly supported by the support arms (left support arm 52, right support arm 54).

The agricultural machine includes the weight 26 provided on the front side of the hood 25, and the obstacle detector device 45 is provided on the side of the weight 26 in the width direction. According to this configuration, the obstacle detector device 45 can accurately detect obstacles existing in the vicinity of the weight 26.

Figure 7:
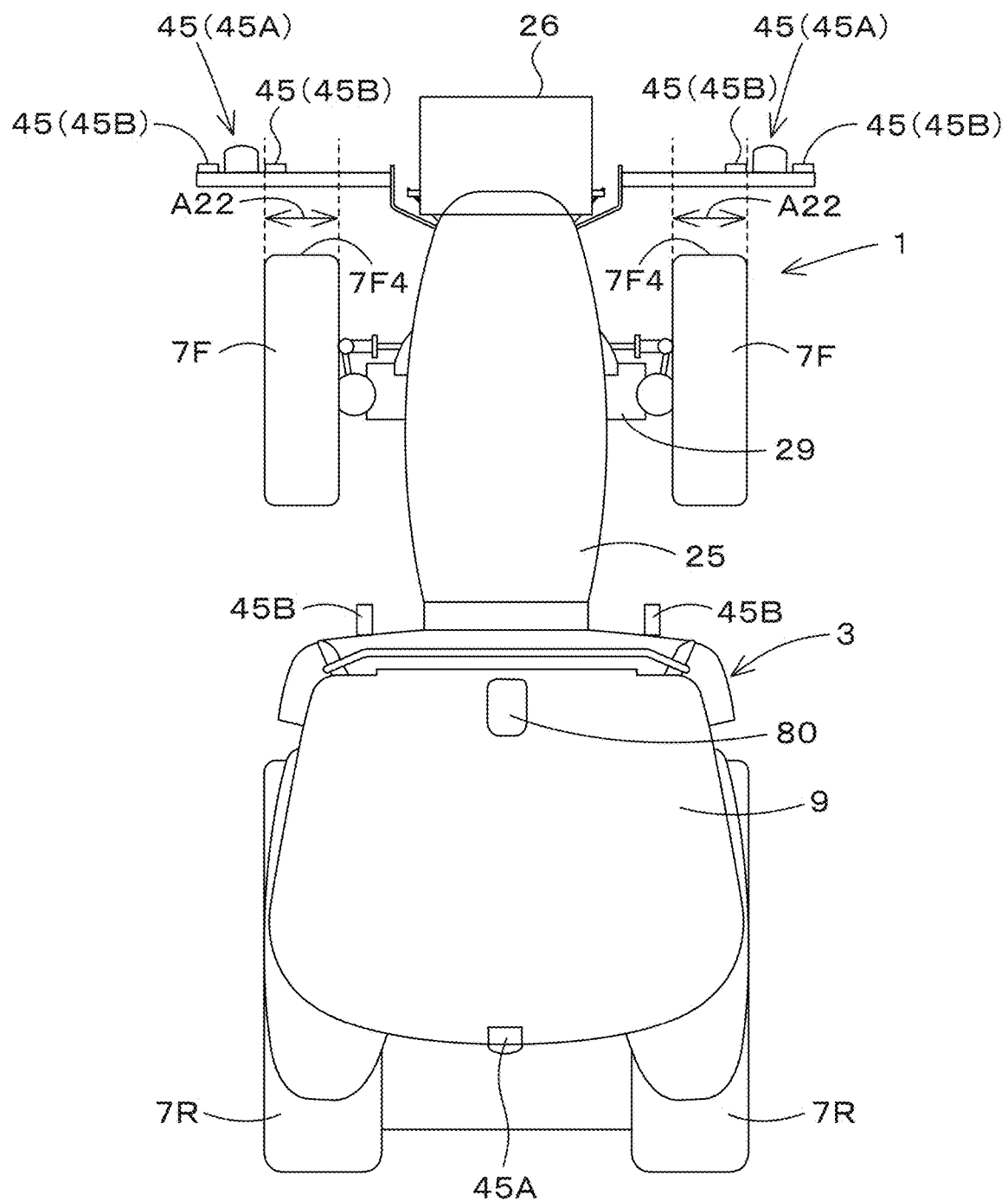
FIG. 7 is a modified example of an obstacle detector device.
Figure 8:
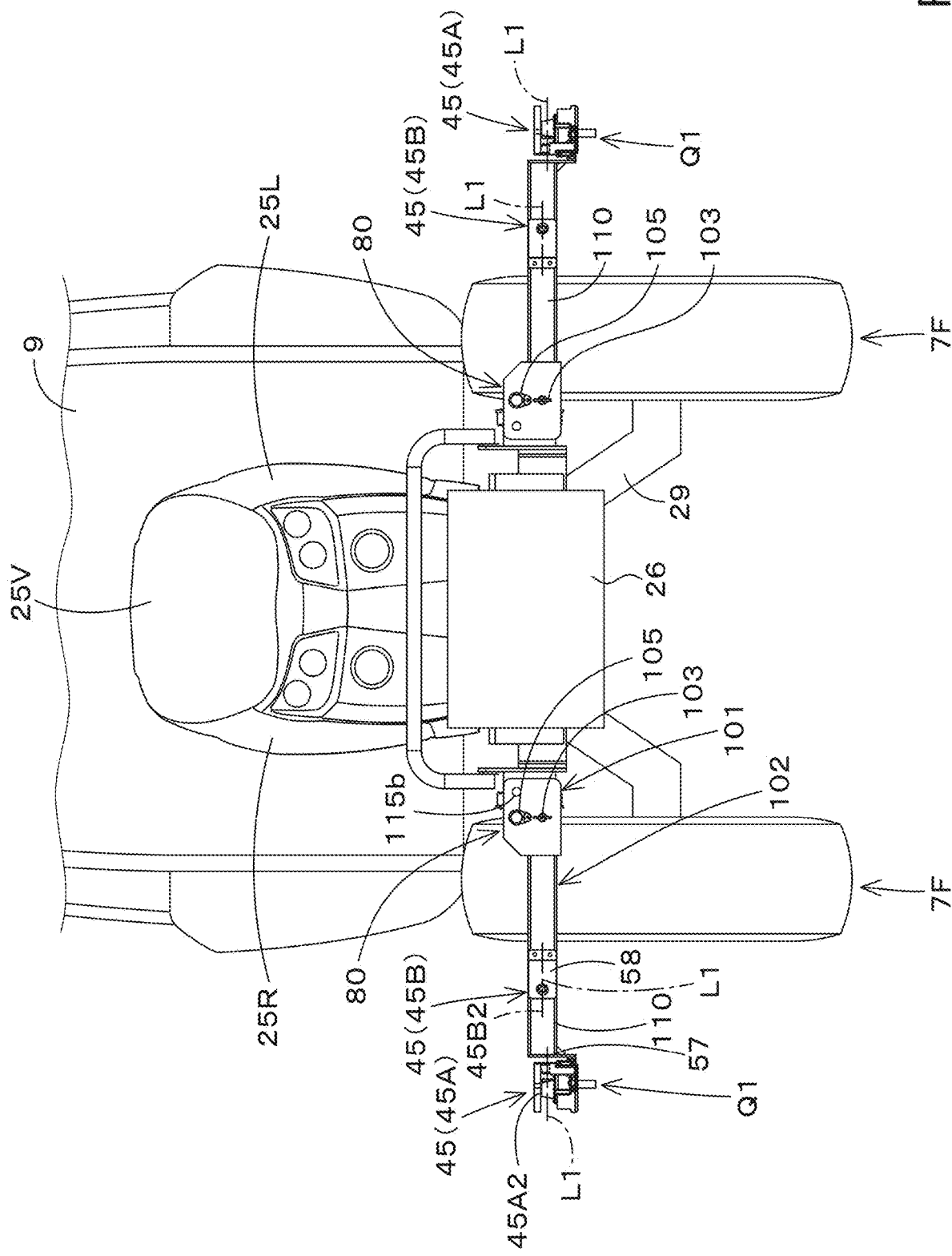
FIG. 8 is a front view of a tractor in which an obstacle detector device is located at a detection position.
Figure 9:
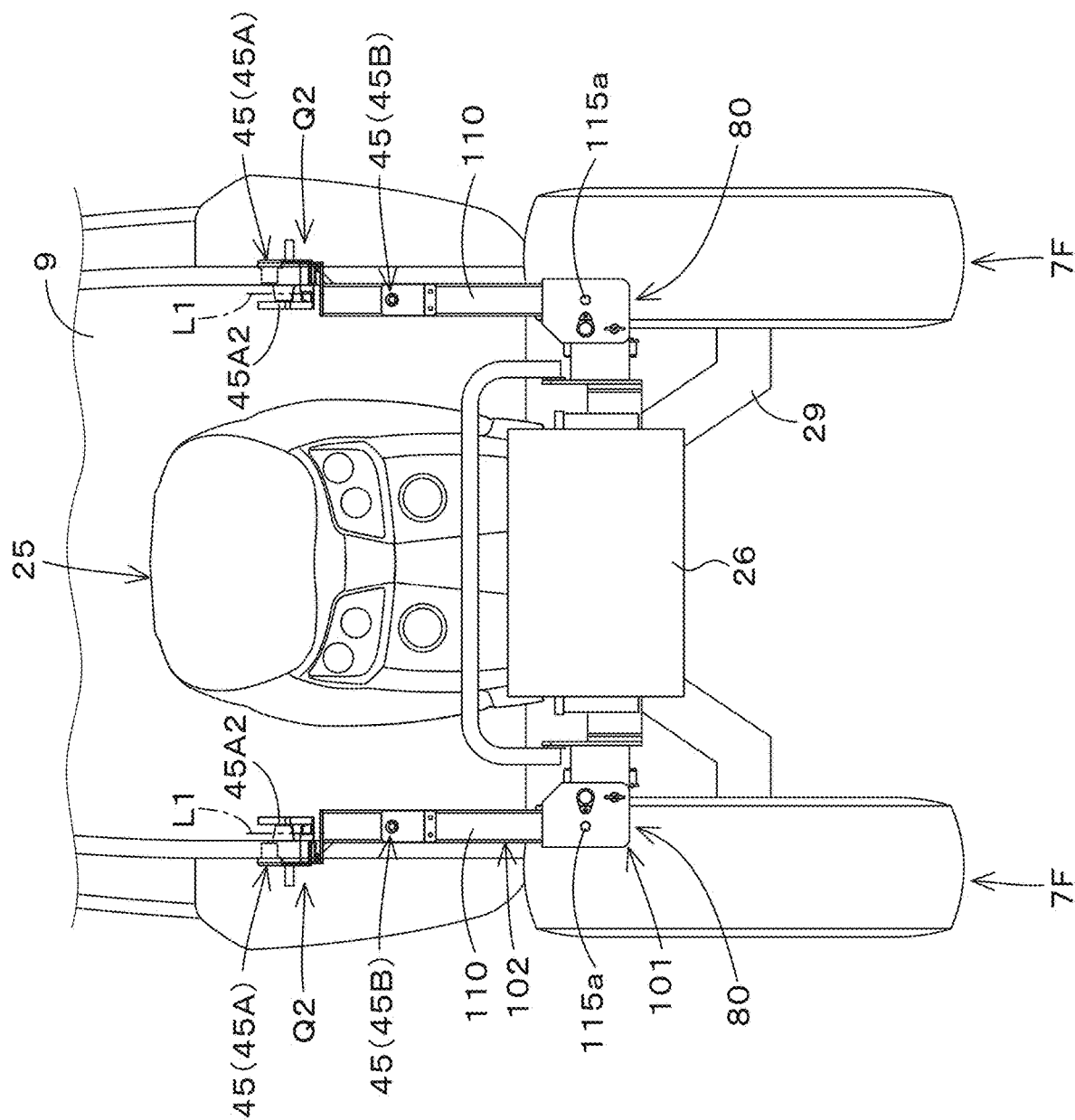
FIG. 9 is a front view of a tractor in which an obstacle detector device is located at an evacuation position.
Figure 10:
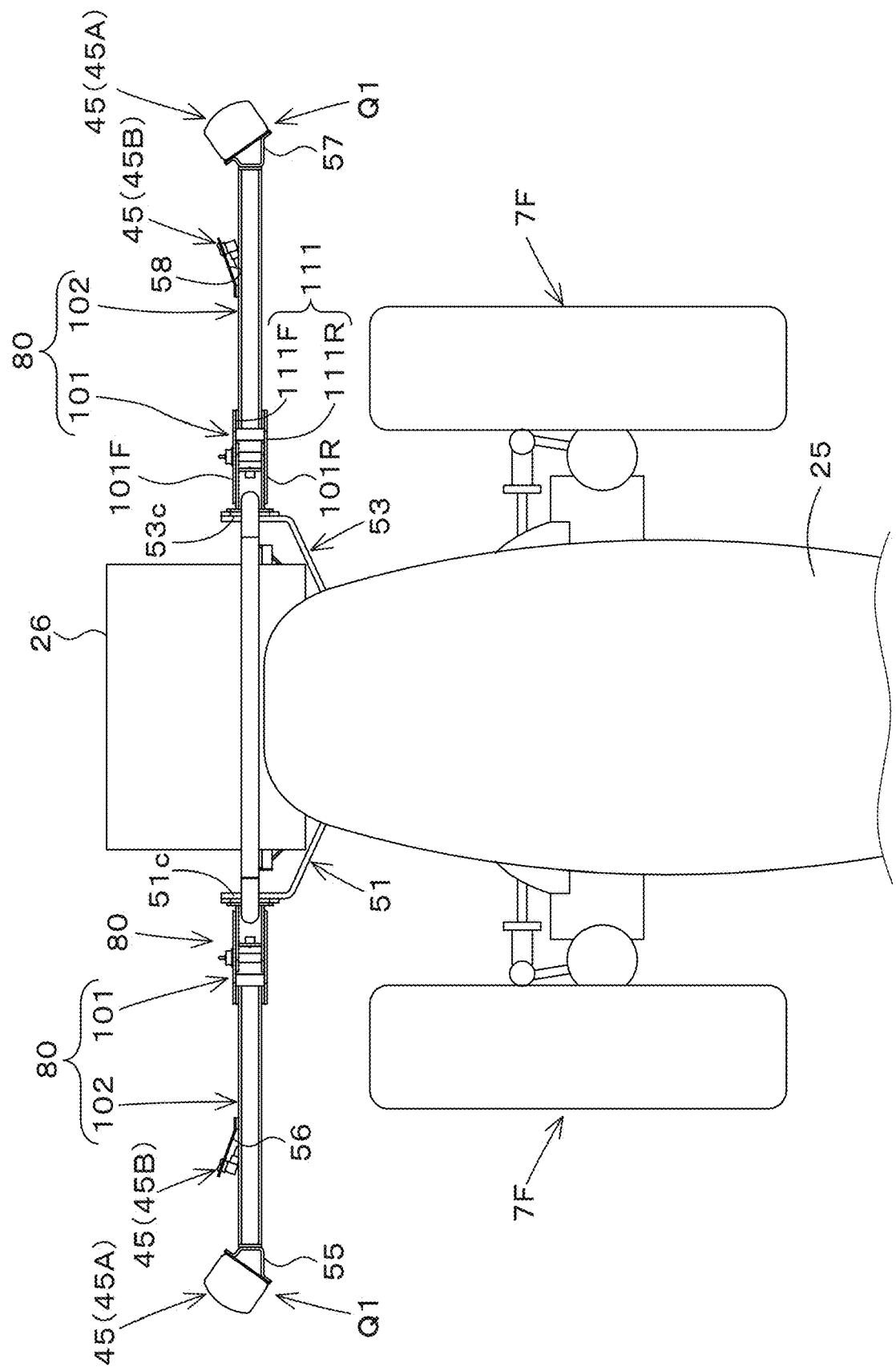
FIG. 10 is a plan view of a tractor in which an obstacle detector device is located at a detection position.
Figure 11:
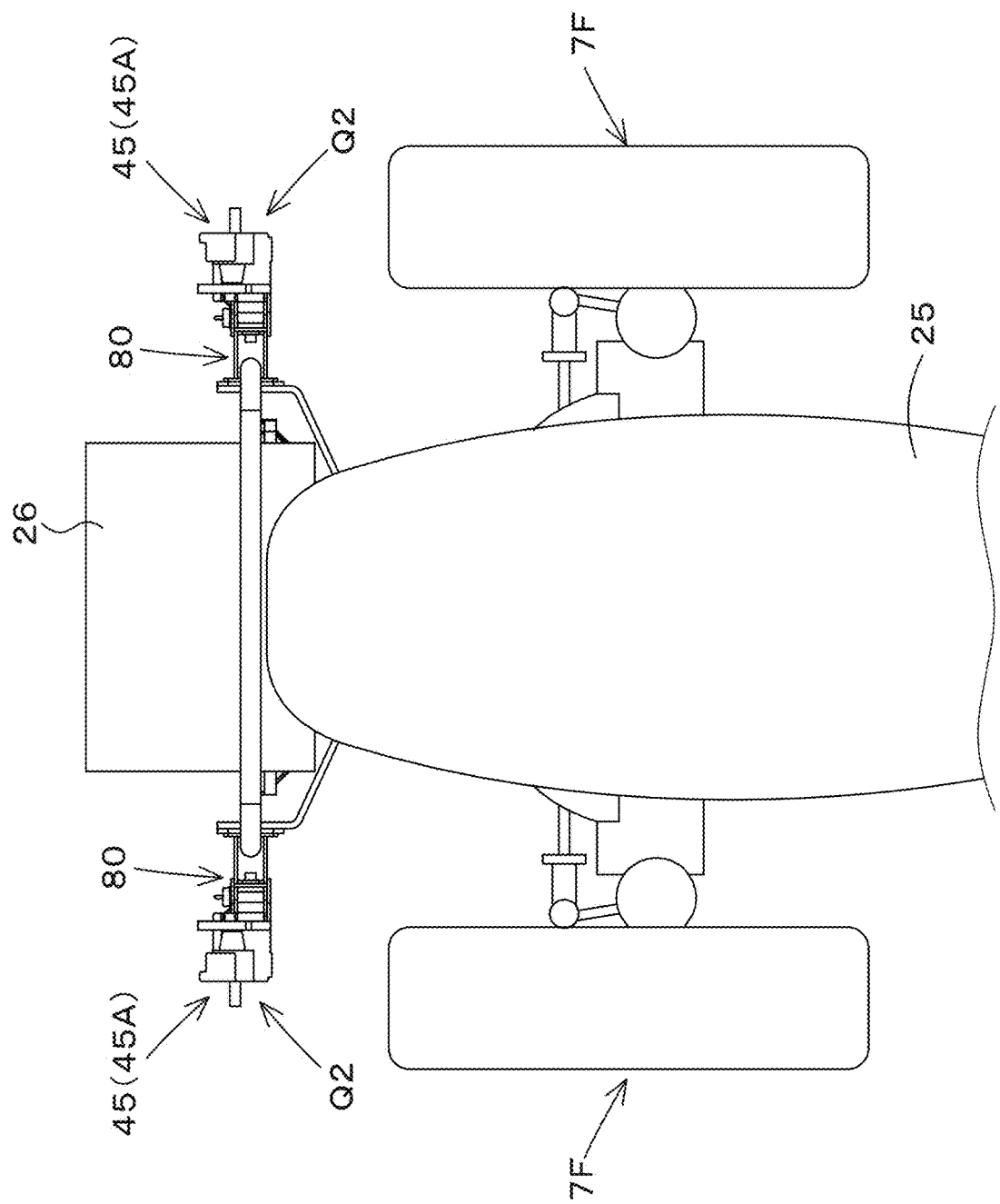
FIG. 11 is a plan view of a tractor in which an obstacle detector device is located at an evacuation position.

In the above-described preferred embodiment, the obstacle detector device 45 is provided in front of the protector device 9, but the obstacle detector device 45 may be provided at a location other than in front of the protector device 9. FIG. 7 shows a variation of the arrangement of the obstacle detector device 45. As shown in FIG. 7, a laser scanner 45A may be provided at the rear portion of the protector device 9, and the sonar 45B may be provided at the left and right portions of the protector device 9. As shown in FIG. 7, the sonar 45B may be provided on both sides of the laser scanner 45A in front of the front wheels 7F. In addition, in front of the front wheel 7F, the laser scanner 45A or sonar 54B may be provided in the opposed range A22 opposite to the tread portion 7F4 of the front wheel 7F.

In the above-described preferred embodiment, the obstacle detector device 45 was fixed to the vehicle body 3 by the support mechanism 50, but instead, as shown in FIG. 8 to FIG. 11, an agricultural machine such as the tractor 1 may be provided with a position changer mechanism 80 that can change the position of the obstacle detector device 45. FIG. 8 to FIG. 11 show a case where a position changer mechanism 80 is provided that can change the position of the obstacle detector device 45 in front of the protector device 9 and outside the width direction of the hood 25.

The position changer mechanism 80 changes the position of the obstacle detector device 45 to a detection position Q1, which is a predetermined position and detects obstacles, and to a evacuation position Q2, which is retreated from the detection position Q1 to the side of the vehicle body 3. The position changer mechanism 80 is provided on the left side and the right side at the front portion of the tractor 1. For convenience of explanation, the position changer mechanism 80 installed on the right side of the front portion of the tractor 1 will be used as an example below. The structure of the position changer mechanism 80 on the left side of the front portion of the tractor 1 is the same as that of the position changer mechanism 80 on the right side.

The position changer mechanism 80 includes a first support arm 101 and a second support arm 102. The first support arm 101 is a support arm fixed to the vehicle body 3, and the second support arm 102 is a support arm that is rotatably supported by the first support arm 101. That is, the position changer mechanism 80 includes a support arm that supports the obstacle detector device 45, and the support arm is capable of changing its position.

Figure 12A:
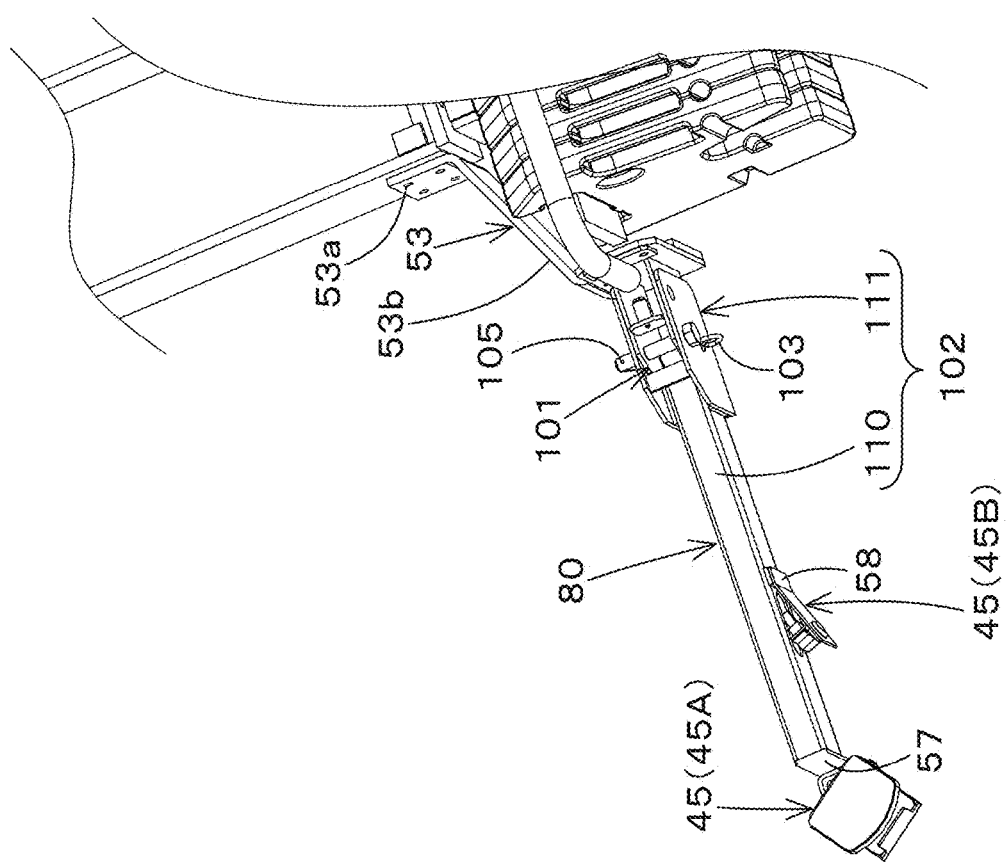
FIG. 12A is a perspective view of a position changer mechanism arranged on a right side of a tractor.
Figure 12B:
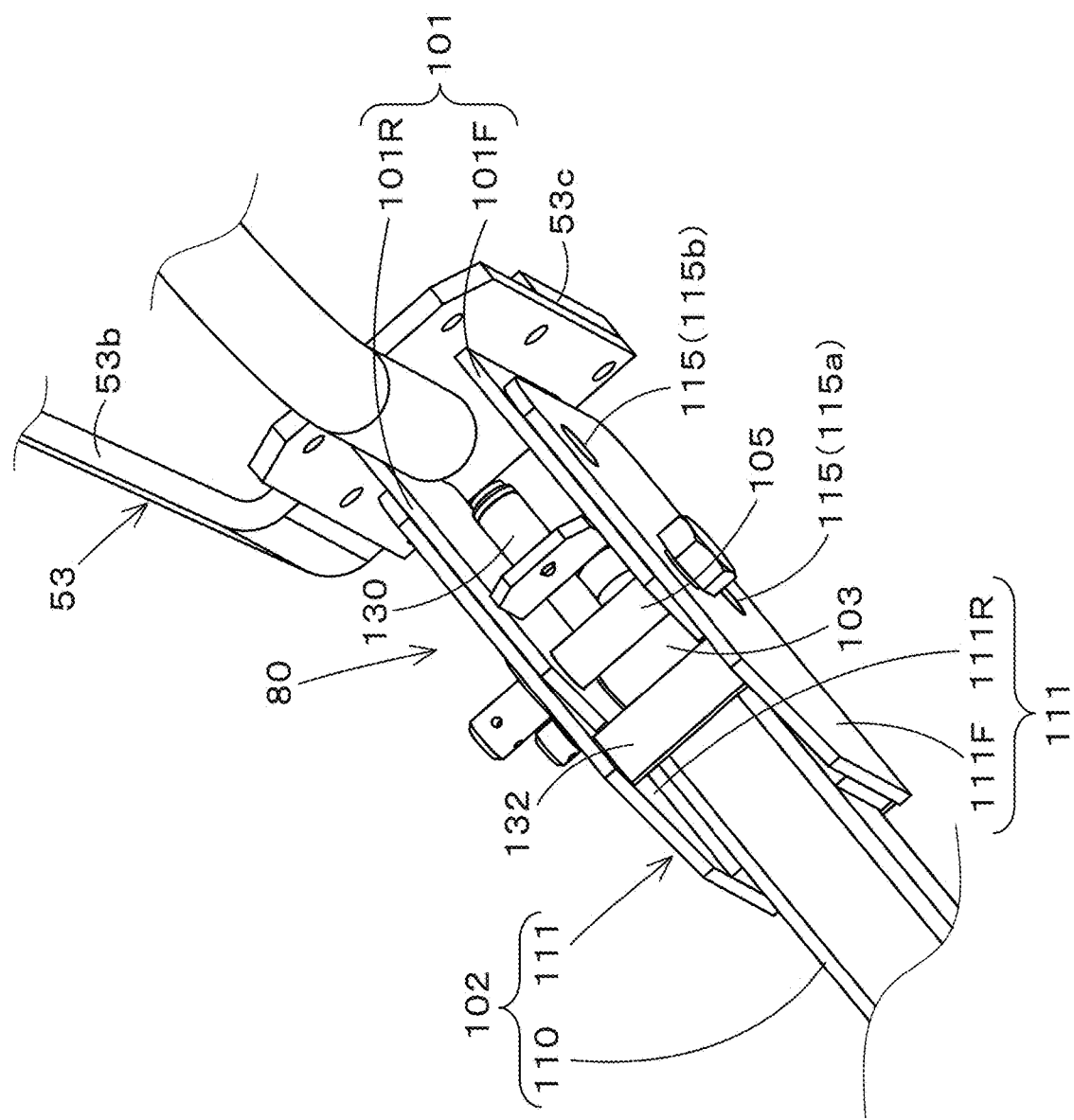
FIG. 12B is an enlarged perspective view of a position changer mechanism arranged on a right side of a tractor.
Figure 12C:
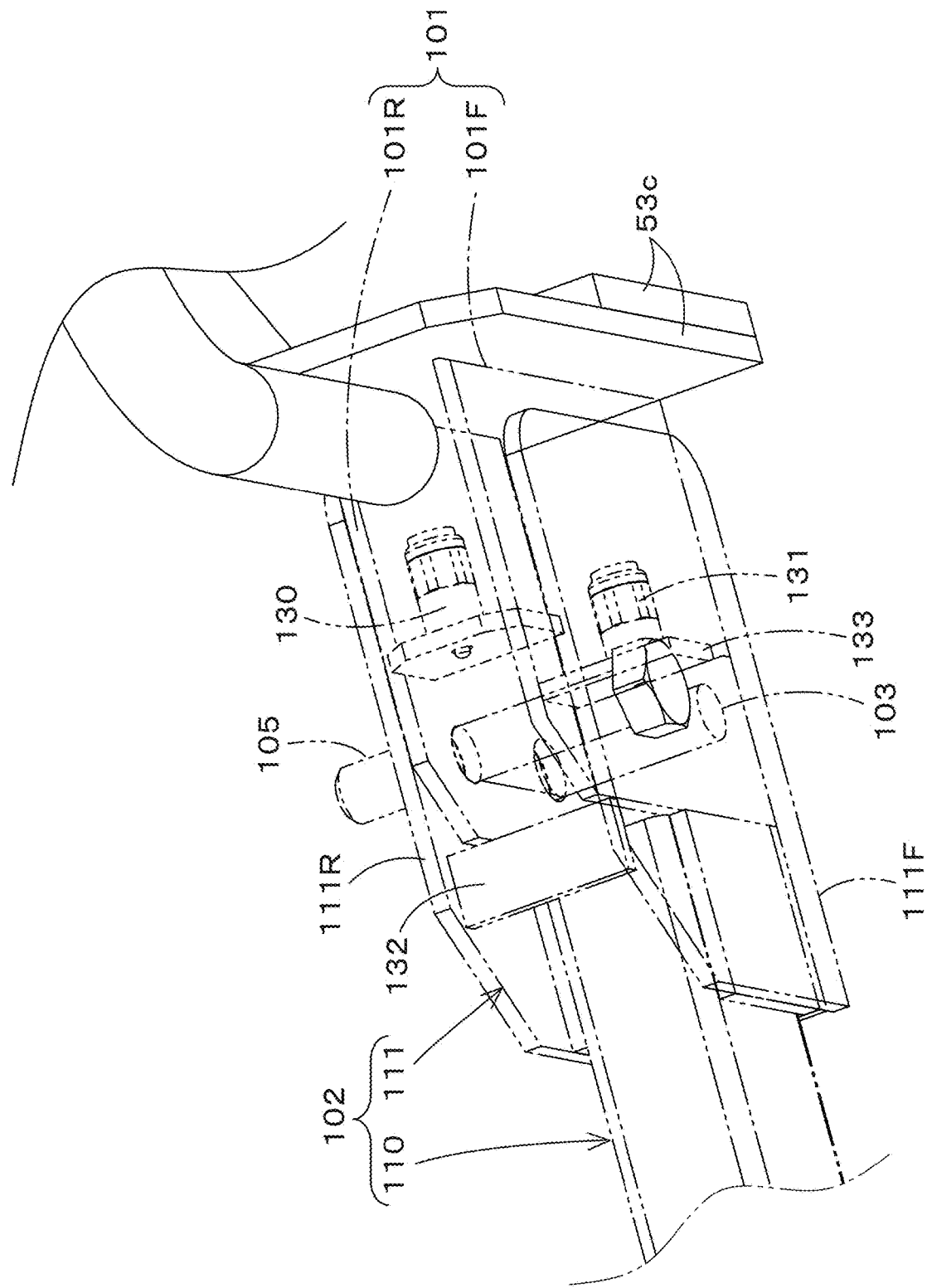
FIG. 12C is a detailed view of a position changer mechanism arranged on a right side of a tractor.

As shown in FIGS. 12A to 12C, the first support arm 101 includes a front plate portion 101F and a rear plate portion 101R extending rearwardly from the front plate portion 101F, and the left ends of the front plate portion 101F and the rear plate portion 101R are fixed to the attachment plate 53C. The front plate portion 101F and the rear plate portion 101R include through holes through the thickness direction, and the rotary axis 105 is inserted into the through holes. In addition, the front plate portion 101F and the rear plate portion 101R include another through-hole than the through-hole into which the rotary axis 105 is inserted, and the lock pin 103 can be inserted into the other through-hole. The lock pin 103 is a pin that can be inserted and removed from the through hole.

The second support arm 102 includes an attachment portion 110 and a pivoting portion 111. The attachment portion 110 is a metal member preferably having a cylindrical shape and to which the obstacle detector device 45 is attached. At the tip (free end side) of the attachment portion 110, a bracket 57 is provided and the housing 45A2 of the laser scanner 45A is attached. The bracket 58 is attached to the middle portion of the attachment portion 110, and the housing 45B2 of the sonar 45B is attached to the bracket 58.

The pivoting portion 111 is connected to the attachment portion 110 and is a portion that rotates around the rotation shaft 105 with respect to the front plate portion 101F and the rear plate portion 101R. The pivoting portion 111 includes a front plate portion 111F and a rear plate portion 111R. The attachment portion 110 is adhered to the right ends of the front plate portion 111F and the rear plate portion 111R. The front plate portion 111F and the rear plate portion 111R include through holes that penetrate in the thickness direction, and the rotary axis 105 is inserted in the through holes. Another through-hole 115 is provided in the front plate portion 111F and the rear plate portion 111R, different from the through-hole into which the rotary axis 105 is inserted, and the lock pin 103 can be inserted in the other through-hole 115.

In the front plate portion 111F and the rear plate portion 111R, the different through holes 115 are provided in at least two locations, and when the lock pin 103 is inserted into one through hole 115a, the pivoting portion 111 (attachment portion 110) is maintained in the detection posture, and when the lock pin 103 is inserted into the other through hole 115b, the pivoting portion 111 (attachment portion 110) is held in the evacuating posture. That is, when in the detection posture, the second support arm 102 is held horizontally by the first support arm 101 to position the obstacle detector device 45 (laser scanner 45A and sonar 45B) at the detection position Q1. On the other hand, the second support arm 102 is held vertically by the first support arm 101 and positions the obstacle detector device 45 (laser scanner 45A and sonar 45B) at the evacuation position Q2 when it is in the evacuation position. In the evacuation position Q2, the obstacle detector device 45 (laser scanner 45A and sonar 45B) is located inside the width direction from the outer side portion 7F2 of the front wheel 7F. That is, in the evacuation position Q2, the irradiation line L1 is vertically oriented (vertical direction) and is not in a posture to detect obstacles. In other words, the position changer mechanism 80 evacuates the obstacle detector device 45 (laser scanner 45A and sonar 45B) to the evacuation position Q2 where the obstacle detector device 45 (laser scanner 45A and sonar 45B) is not used.

As shown in FIGS. 12B and 12C, the position changer mechanism 80 includes the first posture detector device 130 that detects the detection posture of the second support arm 102 and the second posture detector device 131 that detects the evacuation posture of the second support arm 102. The first posture detector device 130 detects that the second support arm 102 is in the detection posture when the detection plate 132 provided over the front plate portion 101F and the rear plate portion 101R contacts the first posture detector device 130. The second posture detector device 131 detects that the second support arm 102 is in the evacuating posture when the detector plate 133 provided at the base portion of the attachment portion 110 (attachment plate 53C side) contacts the second posture detector device 131. The detection information of the first posture detector device 130 and the second posture detector device 131 is input to the controller device 40. The controller device 40, for example, displays the detection information of the first posture detector device 130 and the second posture detector device 131 on the display device 70 (see FIG. 6) provided near the operator seat 10, and controls the automatic traveling to be permitted when starting the automatic traveling under a condition where the arm is in the detection posture and not to be permitted when the arm is in the evacuating posture.

The position changer mechanism 80 changes the position of the obstacle detector device 45 to the detection position Q1, which is a predetermined position and detects obstacles, and the evacuation position Q2, which is evacuated from the detection position Q1 to the vehicle body 3 side. According to this configuration, for example, the obstacle detector device 45 can be placed at the detection position Q1, which is a predetermined position that can detect over a wide area with as few blind spots as possible, while the obstacle detector device 45 can be placed at the evacuation position Q2 where the obstacle detector device 45 is safe. In other words, by allowing the obstacle detector device 45 to be relocated between the detection position Q1 and the evacuation position Q2, the obstacle detector device 45 can be placed in a position where the detection accuracy is as good as possible.

In the case of automatic traveling, by setting the obstacle detector device 45 to the detection position Q1 by the position changer mechanism 80, the automatic traveling can be performed while detecting the presence of obstacles by the obstacle detector device 45. In addition, when the automatic traveling is not performed, the manual traveling can be performed without detection by the obstacle detector device 45 by placing the obstacle detector device 45 to the evacuation position Q2 by the position changer mechanism 80.

The position changer mechanism 80 includes the first support arm 101 fixed to the vehicle body 3 and the second support arm 102 rotatably supported against the first support arm 101. According to this configuration, the obstacle detector device 45 can be easily relocated to the detection position Q1 and the evacuation position Q2 simply by rotating the second support arm 102 with respect to the first support arm 101.

Now, in the above-described preferred embodiment, the position changer mechanism 80 changes the position of the obstacle detector device 45 to the detection position Q1 and the evacuation position Q2, but the obstacle detector device 45 may be moved to a plurality of detection positions Q1.

Figure 13:
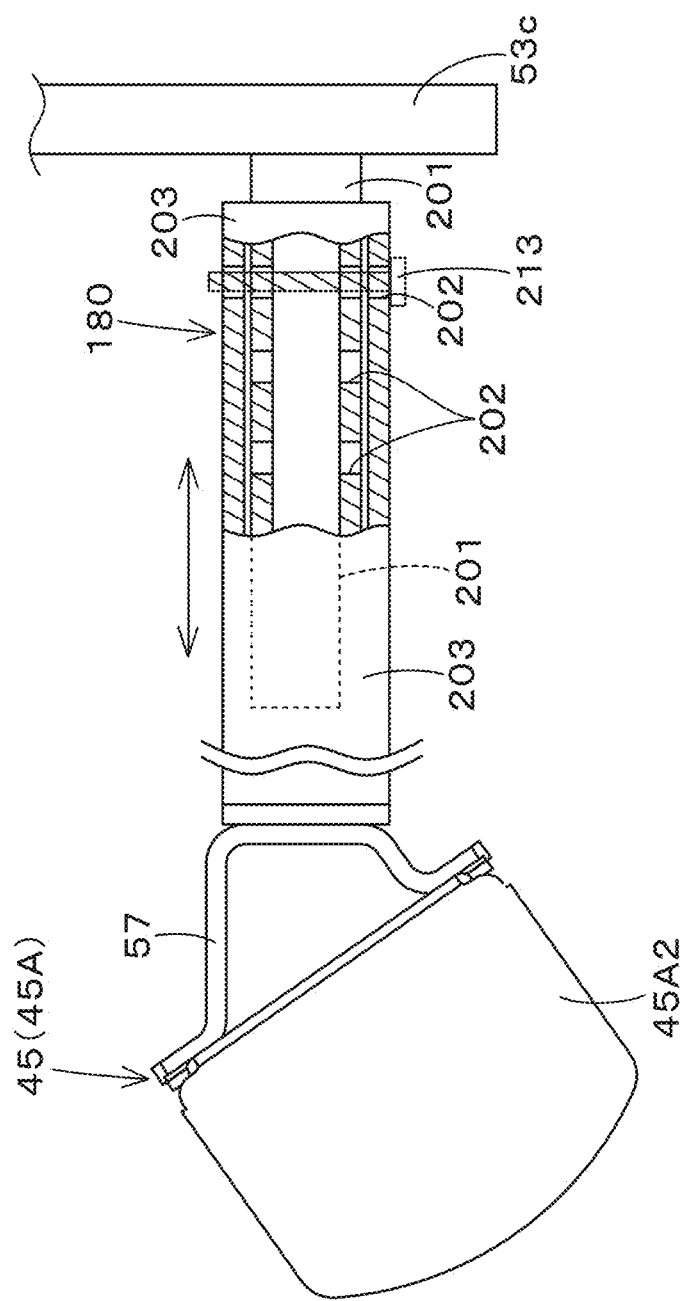
FIG. 13 is a view illustrating a first modified example of a position changer mechanism.

FIG. 13 shows a position changer mechanism 180 to reposition the obstacle detector device 45 to a plurality of detection positions Q1. In FIG. 13, the position changer mechanism 180 is shown on the right side of the tractor 1 as in the preferred embodiment described above, but of course, the position changer mechanism 180 may be provided on the left side of the tractor 1.

The position changer mechanism 180 includes the first support arm 201 fixed to the vehicle body and the third support arm 203 movable in the longitudinal direction of the first support arm 201. The first support arm 201 is a metal member preferably having a cylindrical shape, and one end is fixed to the attachment plate 53c.

The third support arm 203 is a metal member preferably having a cylindrical shape, and similar to the second support arm 102, the bracket 57 and the bracket 58 are attached to the third support arm 203, and the laser scanner 45A and the sonar 45B are attached to each of the bracket 57 and the bracket 58. One end side (opposite the free end) of the third support arm 203 is inserted into the first support arm 201, and its position relative to the first support arm 201 can be changed. In detail, when the third support arm 203 is inserted into the first support arm 201, the third support arm 203 holds the laser scanner 45A and sonar 45B so that the irradiation line L1 of the laser scanner 45A and sonar 45B is in an abbreviated horizontal direction.

A plurality of through holes 202 are provided at predetermined intervals in the longitudinal direction (width direction) in each of the first support arm 201 and the second support arm 102, and the lock pin 213 can be inserted into the through hole 202.

By inserting the lock pin 213 into any of the plurality of through holes 202 in the first support arm 201 and the second support arm 102, the position of the lock pin 213 relative to the first support arm 201 can be fixed (held), and by changing the through hole 202 into which the lock pin 213 is inserted, the position of the laser scanner 45A and the sonar 45B in the width direction, that is, the position of the detection position Q1, can be changed.

Figure 14A:
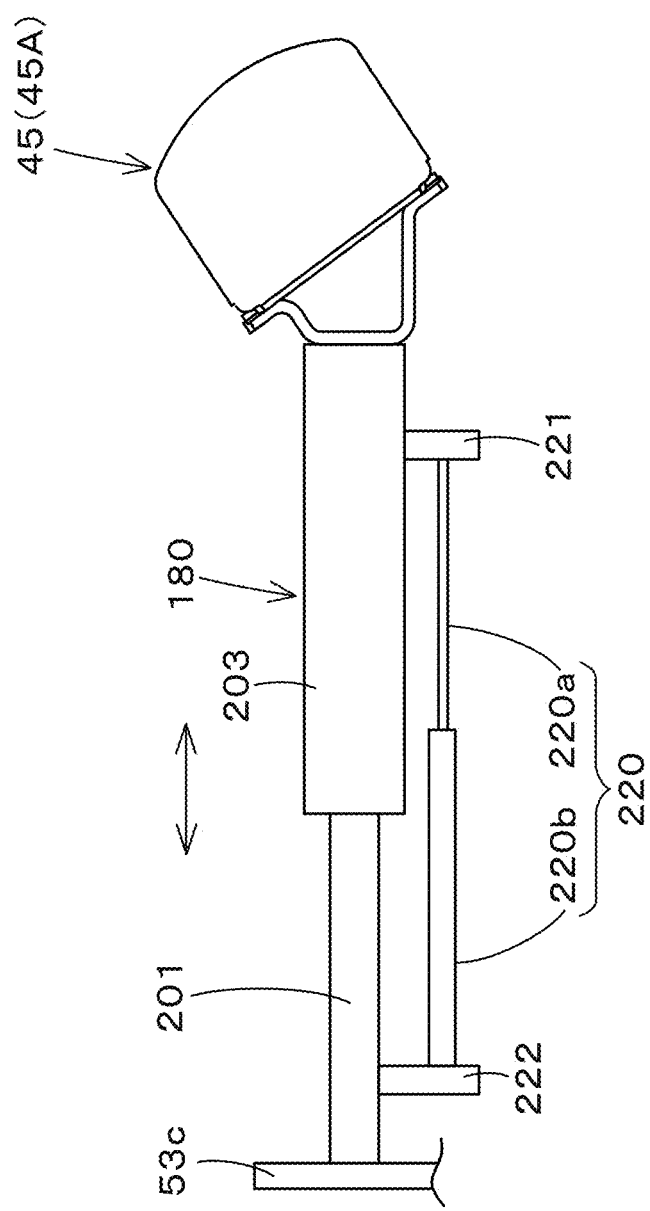
FIG. 14A is a view illustrating a second modified example of a position changer mechanism.

In the above-described preferred embodiment, the position changer mechanism 180 is configured to change the position of the third support arm 203 relative to the first support arm 201 via the lock pin 213, but the position changer mechanism 180 may have other configurations. FIG. 14A shows an example of positional change by a cylinder 220, and FIG. 14B shows an example of positional change by a feeder screw mechanism 230.

As shown in FIG. 14A, the cylinder 220 can be extended or retracted by a medium such as air or hydraulic pressure, and the rod 220a is attached to the third support arm 203 via the bracket 221, and the tube 220b is attached to the first support arm 201 via the bracket 222. According to this configuration, the obstacle detector device 45 can be relocated to any detection position Q1 by extending and retracting the cylinder 220.

Figure 14B:
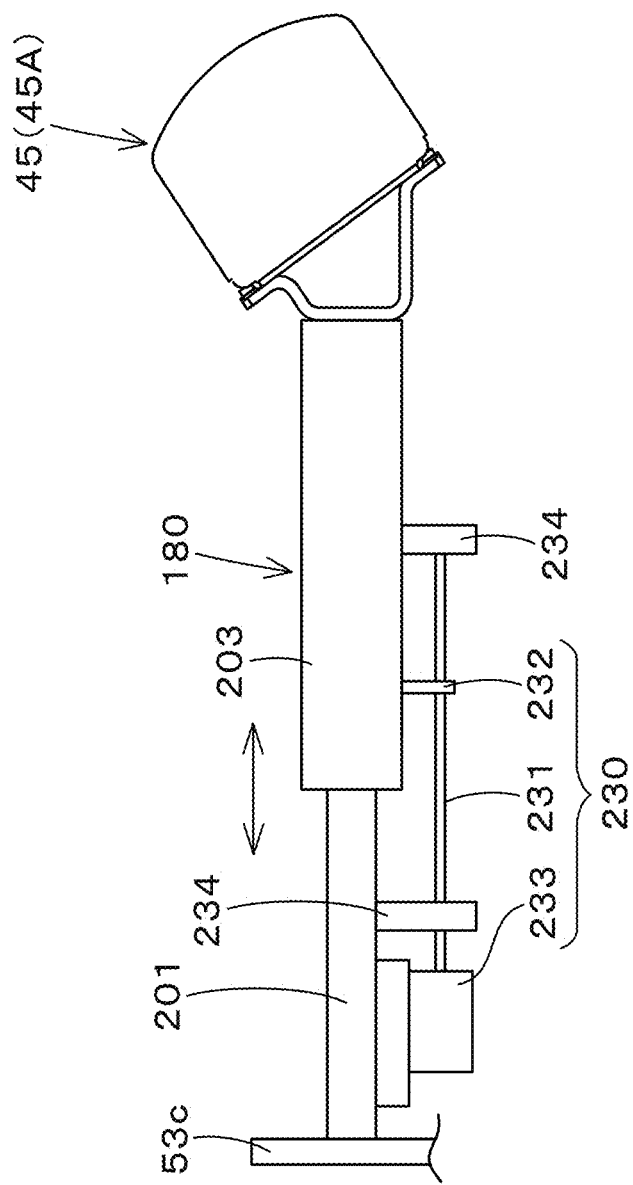
FIG. 14B is a view illustrating a third modified example of a position changer mechanism.

As shown in FIG. 14B, the feeder screw mechanism 230 includes the feeder screw 231, the moving body 232, and the motor 233. The feeder screw 231 extends along the first support arm 201 and the third support arm 203, and both ends are rotatably attached to the first support arm 201 and the third support arm 203 by bearings 234. The moving body 232 is screwed to the feeder screw 231 and is fixed to the third support arm 203. The motor 233 is fixed to the first support arm 201 and rotates the feeder screw 231. According to this configuration, the obstacle detector device 45 can be relocated to any detection position Q1 by rotating the feeder screw 231 forward or reverse by the motor 233.

The tractor 1 may include a plurality of detection positions Q1 registered, and a predetermined detection position Q1 can be selected among the plurality of registered detection positions Q1. For example, when the obstacle detector device 45 is located on the left side and the right side, the respective detection positions Q1 for the left side and the right side are registered in either the controller device 40 or the display device 70, as shown in FIG. 17A. In FIG. 17A, symbols J1, J2 . . . indicate the detection positions Q1 for convenience of explanation, and different symbols mean different detection positions Q1.

Figure 17B:
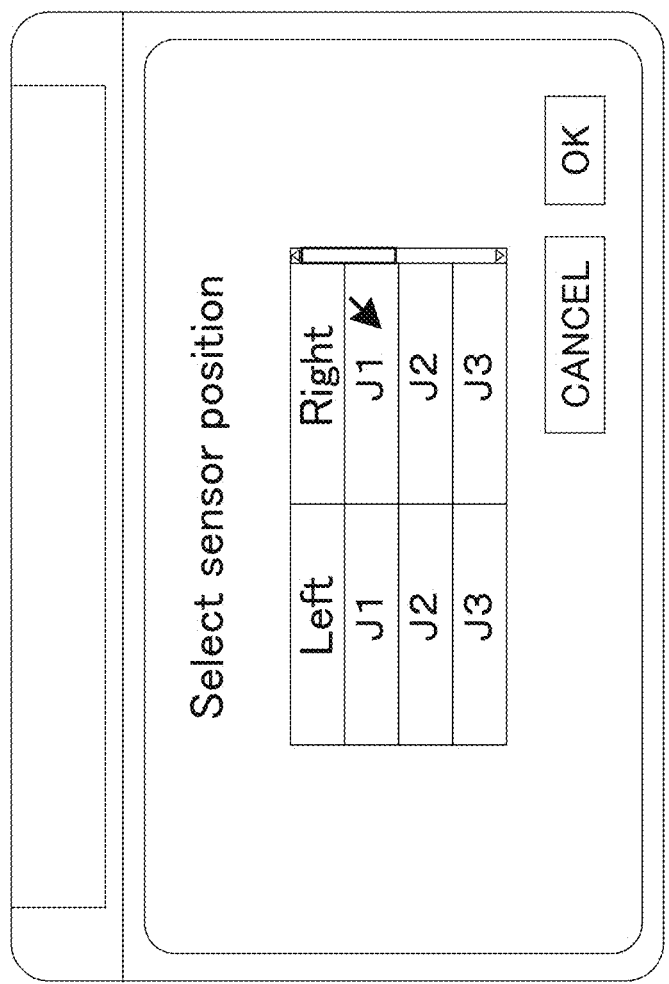
FIG. 17B is a view illustrating an example of displaying a detection position on a display device.

As shown in FIG. 17B, a list of registered detection positions Q1 is displayed on the display device 70, and the operator selects a plurality of detection positions Q1 by operating the display device 70, depending on the agricultural operation, the agricultural machine, or the working device (implement). The position changer mechanism 180 positions the obstacle detector device 45 at the detection position Q1 selected by the display device 70, and the like. The position changer mechanism 180 may automatically change the detection position Q1 according to the width of the working device (implement) mounted on the tractor 1.

The position changer mechanism 180 changes the position of the obstacle detector device 45 to a plurality of detection positions Q1 at which the obstacle can be detected. According to this configuration, since the obstacle detector device 45 can change the detection positions Q1, for example, the positions in the width direction of the lateral area A20 and the area A21 in front of the front wheels 7F shown in FIG. 1 can be changed. In other words, the width direction of the lateral area A20 and the front area A21 of the front wheels 7F can be changed according to various situations, and by changing the detection areas (lateral area A20 and front area A21) according to the specifications (type) of the agricultural machine or agricultural work, obstacles can be detected more accurately. It is possible to detect obstacles more accurately by changing the detection area (side area A20, front area A21) according to the specifications (type) of agricultural machine or agricultural work.

The position changer mechanism 180 includes the first support arm 201 fixed to the vehicle body 3 and the third support arm 203 movable in the longitudinal direction of the first support arm 201. According to this configuration, the position of the obstacle detector device 45 can be easily changed by the support arms (first support arm 201 and third support arm 203).

The position changer mechanisms 80 and 180 can be applied to other installed obstacle detector devices 45 other than the obstacle detector devices 45 installed on the side of the hood 25 or on the front wheels 7F. It can also be applied to tractors that are not provided with the obstacle detector devices 45 on the side of the hood 25 or on the front wheels 7F. For example, the position changer mechanisms 80 and 180 may be provided to the tractor 1 that has the obstacle detector device 45 around the protector device 9, or to a conventional tractor described in Japanese unexamined patent application publication No. 2018-174890 and the like.

In the position changer mechanisms 80 and 180, the support arms (first support arms 101 and 201) on the fixed side may be attached to the left support portion 51 and the right support portion 53 attached to the weight 26 as in FIG. 15.

In the position changer mechanisms 80 and 180, the brackets 55 to 58 including the hanging portion 260 may be hung on the support arms (second support arm 102, third support arm 203) on the moving side, and the fastener tools 261 may be attached to the support arms on the moving side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a vehicle body including a front wheel and a rear wheel;
a hood at a front portion of the vehicle body;
a protector provided to the vehicle body to protect an operator seat; and
an obstacle detector to detect an obstacle, the obstacle detector being located in front of the protector outwardly in a width direction of the hood, in front of the front wheel, and between the hood and the front wheel.

2. The agricultural machine according to claim 1, further comprising:
a second obstacle detector is-located in front of the protector outwardly in a width direction of the hood, in front of the front wheel, and on a side of the front wheel.

3. The agricultural machine according to claim 2, further comprising:

a front axle frame supporting the hood; and a support arm extending outwardly from the front axle frame side in the width direction to support the obstacle detector and the second obstacle detector.

4. The agricultural machine according to claim 2, further comprising:

a weight located on a front side of the hood; wherein the obstacle detector and the second obstacle detector are located on a side of the weight in the width direction.

5. The agricultural machine according to claim 2, further comprising:

a controller to control automatic traveling of the vehicle body; wherein the controller controls the automatic traveling based on a detection result of the obstacle detected by at least one of the obstacle detector and the second obstacle detector.

6. The agricultural machine according to claim 1, further comprising:

a front axle frame supporting the hood; and a support arm extending outwardly from the front axle frame side in the width direction to support the obstacle detector.

7. The agricultural machine according to claim 6, further comprising:

a weight located on a front side of the hood; wherein the obstacle detector is located on a side of the weight in the width direction.

8. The agricultural machine according to claim 6, further comprising:

a controller to control automatic traveling of the vehicle body; wherein the controller controls the automatic traveling based on a detection result of the obstacle detected by the obstacle detector.

9. The agricultural machine according to claim 1, further comprising:

a weight located on a front side of the hood; wherein the obstacle detector is located on a side of the weight in the width direction.

10. The agricultural machine according to claim 9, further comprising:

a controller to control automatic traveling of the vehicle body; wherein the controller controls the automatic traveling based on a detection result of the obstacle detected by the obstacle detector.

11. The agricultural machine according to claim 1, further comprising:

a controller to control automatic traveling of the vehicle body; wherein the controller controls the automatic traveling based on a detection result of the obstacle detected by the obstacle detector.

12. An agricultural machine comprising:

a vehicle body including a front wheel and a rear wheel;

a hood at a front portion of the vehicle body;

a protector provided to the vehicle body to protect an operator seat;

an obstacle detector to detect an obstacle, the obstacle detector being located in front of the protector outwardly in a width direction of the hood;

a position changer to change a position of the obstacle detector; and a display operable to select, as a detection position appropriate for the obstacle detector to detect an obstacle, at least one registered position from a plurality of registered positions each of which is registered as a position selectable as the detection position; wherein the position changer is configured so that, when the display having been previously operated to select one registered position as the detection position is newly operated to select another registered position different from the registered position having been previously selected as the detection position, the position changer changes the position of the obstacle detector to the another registered position selected as the detection position.

13. The agricultural machine according to claim 12, wherein the position changer includes an arm supported by the vehicle body to be movable in a longitudinal direction of the arm; and the position changer is configured to change the position of the obstacle detector by moving the arm in the longitudinal direction of the arm.

14. The agricultural machine according to claim 13, wherein the arm of the position changer is located so that the longitudinal direction of the arm corresponds to the width direction of the hood.

15. The agricultural machine according to claim 12, wherein the display is configured to display a list of the plurality of registered positions each of which is registered as a position to be selected as the detection position, and is operable to select at least one registered position from the list of the plurality of registered positions displayed by the display.

16. The agricultural machine according to claim 12, wherein the agricultural machine is able to have a working implement attached to the vehicle body, the working implement being one of various working implements configured to be attached to the vehicle body; and the plurality of registered positions, each of which is registered as a position to be selected as the detection position, correspond to the various working implements, respectively.

17. The agricultural machine according to claim 12, further comprising:

a controller to control automatic traveling of the agricultural machine including the vehicle body with the front wheel and the rear wheel, and to control the automatic traveling based on a result of detection of an obstacle by the obstacle detector.

* * * * *